US010441928B2

United States Patent
Rigas

(10) Patent No.: US 10,441,928 B2
(45) Date of Patent: Oct. 15, 2019

(54) PIVOTING BLENDER

(71) Applicant: Peter Rigas, Yardley, PA (US)

(72) Inventor: Peter Rigas, Yardley, PA (US)

(73) Assignee: Tomzi International, Ltd, Yardley, PA (US)

( * ) Notice: Subject to any disclaimer, the term of this patent is extended or adjusted under 35 U.S.C. 154(b) by 0 days.

(21) Appl. No.: 16/059,073

(22) Filed: Aug. 9, 2018

(65) Prior Publication Data

US 2018/0361330 A1  Dec. 20, 2018

Related U.S. Application Data

(63) Continuation-in-part of application No. 15/784,392, filed on Oct. 16, 2017, now Pat. No. 10,112,157, which is a continuation-in-part of application No. 15/349,042, filed on Nov. 11, 2016, now Pat. No. 9,789,453.

(60) Provisional application No. 62/253,695, filed on Nov. 11, 2015.

(51) Int. Cl.
| | |
|---|---|
| *B01F 7/00* | (2006.01) |
| *A47J 43/046* | (2006.01) |
| *B01F 15/00* | (2006.01) |
| *B01F 7/16* | (2006.01) |
| *B01F 11/00* | (2006.01) |
| *B01F 13/00* | (2006.01) |

(52) U.S. Cl.
CPC ......... *B01F 7/00933* (2013.01); *A47J 43/046* (2013.01); *B01F 7/00975* (2013.01); *B01F 7/162* (2013.01); *B01F 11/0017* (2013.01); *B01F 13/0033* (2013.01); *B01F 15/00733* (2013.01); *B01F 2215/0026* (2013.01)

(58) Field of Classification Search
CPC ...... A47J 43/046; A47J 43/07; A47J 43/0716; A47J 43/085; B01F 2015/00597; B01F 7/162; B01F 15/0295; B01F 7/00933; B01F 2215/0026; B01F 7/00966
See application file for complete search history.

(56) References Cited

U.S. PATENT DOCUMENTS

| | | | | |
|---|---|---|---|---|
| 3,635,147 A | * | 1/1972 | Lee | A47J 27/14 366/147 |
| 4,048,473 A | * | 9/1977 | Burkhart | A47J 27/004 219/389 |
| 4,173,925 A | * | 11/1979 | Leon | A47J 27/14 219/389 |
| 4,301,717 A | * | 11/1981 | Knees | A47J 27/14 366/185 |
| 4,450,758 A | * | 5/1984 | Belinkoff | A47J 37/047 215/236 |
| D285,404 S | * | 9/1986 | Wang | D7/377 |

(Continued)

OTHER PUBLICATIONS

International Search Report and Written Opinion for PCT/US2018/055966, dated Jan. 23, 2019.

*Primary Examiner* — Tony G Soohoo
(74) *Attorney, Agent, or Firm* — Joseph E. Maenner; Maenner & Associates, LLC

(57) ABSTRACT

A blender assembly includes a base and a blender pivotally mounted on the base such that the blender pivots in only a single plane. A magnetic locking assembly releasably locks the blender to the base and unlocks the blender from the base to allow the blender to pivot with respect to the base.

13 Claims, 31 Drawing Sheets

(56) References Cited

U.S. PATENT DOCUMENTS

| | | | | |
|---|---|---|---|---|
| 4,753,892 | A * | 6/1988 | Coombs | B01F 9/0014 |
| | | | | 422/258 |
| D384,548 | S * | 10/1997 | Hsieh | D7/376 |
| 5,960,707 | A * | 10/1999 | Hoeberigs | A47J 37/1228 |
| | | | | 366/239 |
| 6,021,707 | A * | 2/2000 | Bauer | A47J 27/14 |
| | | | | 414/421 |
| 6,145,432 | A * | 11/2000 | Bellue, Jr. | A23B 4/005 |
| | | | | 366/139 |
| 6,241,380 | B1 * | 6/2001 | Bornemann | B01F 9/106 |
| | | | | 366/217 |
| 6,374,727 | B1 * | 4/2002 | Cretors | A23L 7/187 |
| | | | | 366/185 |
| 6,595,680 | B2 * | 7/2003 | Sanpei | A47J 43/04 |
| | | | | 366/147 |
| 7,717,613 | B1 * | 5/2010 | Epps | A47J 43/042 |
| | | | | 366/205 |
| 8,122,815 | B2 * | 2/2012 | Wolfe | A47J 36/165 |
| | | | | 99/348 |
| 8,707,862 | B1 * | 4/2014 | Oliver | A47J 27/004 |
| | | | | 99/326 |
| 9,693,654 | B2 * | 7/2017 | Smith | A47J 36/34 |
| 9,789,453 | B2 * | 10/2017 | Rigas | B01F 11/0017 |
| 9,888,803 | B2 * | 2/2018 | Xu | A47J 27/00 |
| 10,112,157 | B1 * | 10/2018 | Rigas | B01F 15/00733 |
| 2006/0039235 | A1 * | 2/2006 | McGill | A47J 43/046 |
| | | | | 366/279 |
| 2010/0014380 | A1 * | 1/2010 | Kolar | A47J 43/0716 |
| | | | | 366/347 |
| 2010/0038462 | A1 * | 2/2010 | Kolar | A47J 43/0716 |
| | | | | 241/285.3 |
| 2018/0361330 | A1 * | 12/2018 | Rigas | B01F 7/00933 |

* cited by examiner

PIVOTING BLENDER

CROSS-REFERENCE TO RELATED APPLICATION

The present application is a continuation-in-part of U.S. patent application Ser. No. 15/784,392, filed on Oct. 16, 2017, now U.S. Pat. No. 10,112,157, which is a continuation-in-part of U.S. patent application Ser. No. 15/349,042, filed on Nov. 11, 2016, now U.S. Pat. No. 9,789,453 which claims priority from U.S. Provisional Patent Application Ser. No. 62/253,695, filed on Nov. 11, 2015, which are all incorporated by reference herein in their entireties.

BACKGROUND OF THE INVENTION

Field of the Invention

The present invention relates to a blender for food processing, and, in particular, to a blender that pivots relative to a mount to assist in processing food inside a blender.

Description of the Related Art

Blenders are often used in both home and industrial kitchens to process food. Occasionally, however, food particles attach to the side walls of the blender or get stuck underneath the blender's cutting blades and, as a result, the food may not be properly blended. Presently, in order to properly blend this food, the blender must be turned off, its lid removed, and a spatula or other utensil must be inserted into the blender to manually scrape this food off the blender wall and away from the blades. This process is time consuming and presents the possibility of contaminating the food if the utensil is dirty.

It would be beneficial to provide a blender that can knock loose the unblended food for ultimate blending without having to stop the blender or insert a utensil into the blender to stir the food.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides a blender assembly that includes a motor mount pivotally mounted on a base, such that the motor mount is only pivotable in a front-to-back direction.

In an alternative embodiment, the present invention provides a blender assembly that includes a motor mount pivotally mounted on a base, such that the motor mount is pivotable in a 360° motion.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION OF THE PRESENT INVENTION

Figure 1:
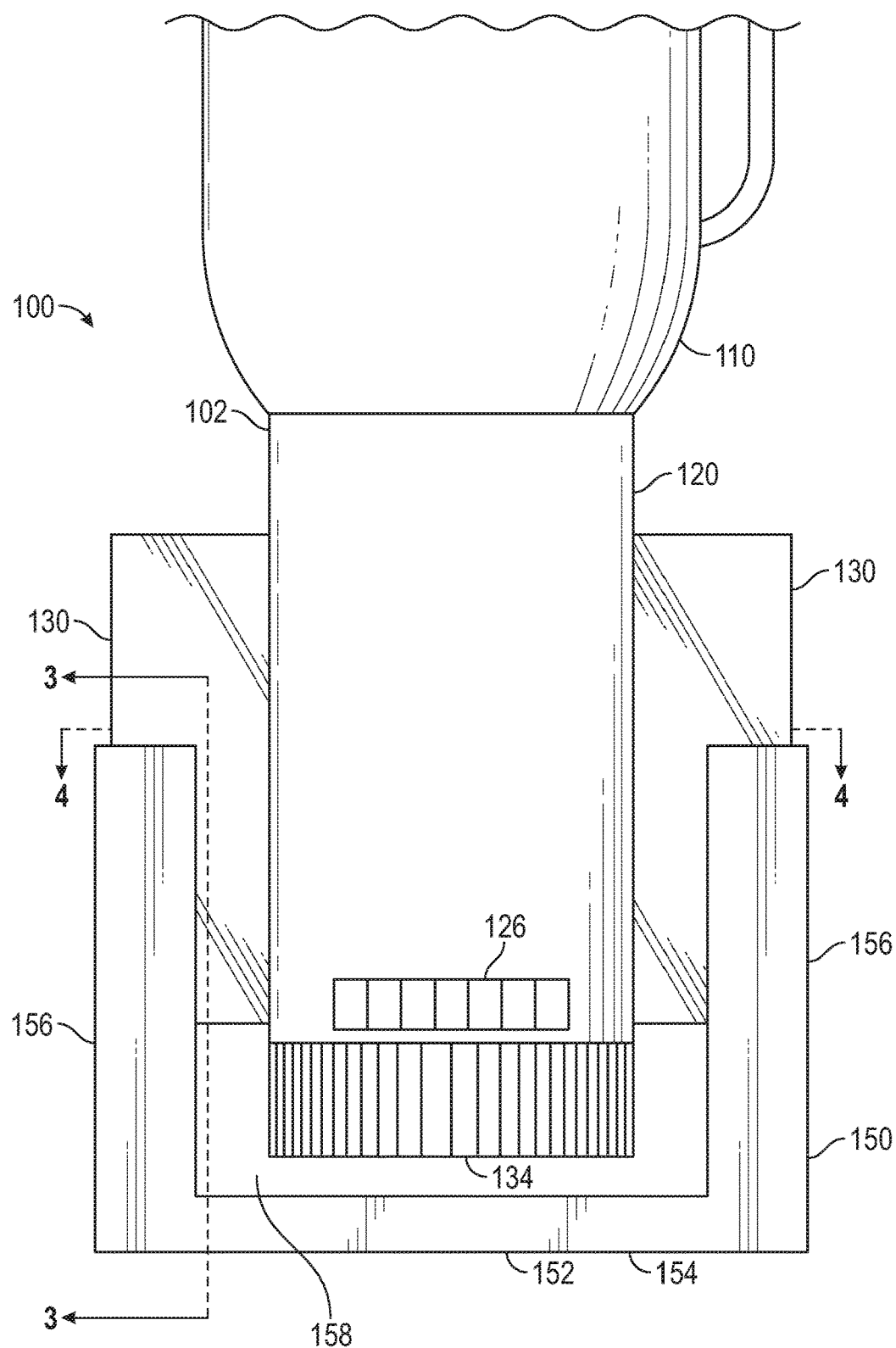
FIG. 1 shows a front elevational view of a blender assembly mounted on a pivot stand according to a first exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Referring to FIGS. 1-6, a blender assembly 100 according to a first exemplary embodiment of the present invention is shown. Blender assembly 100 includes a pivoting mechanism that allows the user to rock the blending portion of blender assembly 100 in a front-to-back direction and to forcefully engage the blending portion with a hard stop to knock loose any food particles that may be attached to the sidewalls of the blender container.

Blender assembly 100 includes a blending portion 102 that includes a blender container 110 releasably mountable onto a pivoting blender motor assembly 120. Blender container 110 can be any known blender that is used to process food inserted therein and is not necessarily the scope of the present invention, and need not be described in detail.

Pivoting blender motor assembly 120 is pivotally mounted onto a pivot base 150 such that blender motor assembly 120 pivots in only a single plane, such as for example, in a front-to-back direction. The pivoting is performed by hand, in the absence of any motors, gears, or other mechanical or electromechanical devices to physically pivot blender motor assembly 120 with respect to pivot base 150.

Pivot base 150 can be mounted on a flat surface, such as, for example, a tabletop. In a commercial environment, pivot base 150 can be fixedly mounted to the flat surface, although those skilled in the art will recognize that pivot base 150 can be removably placed on the flat surface.

Figure 2:
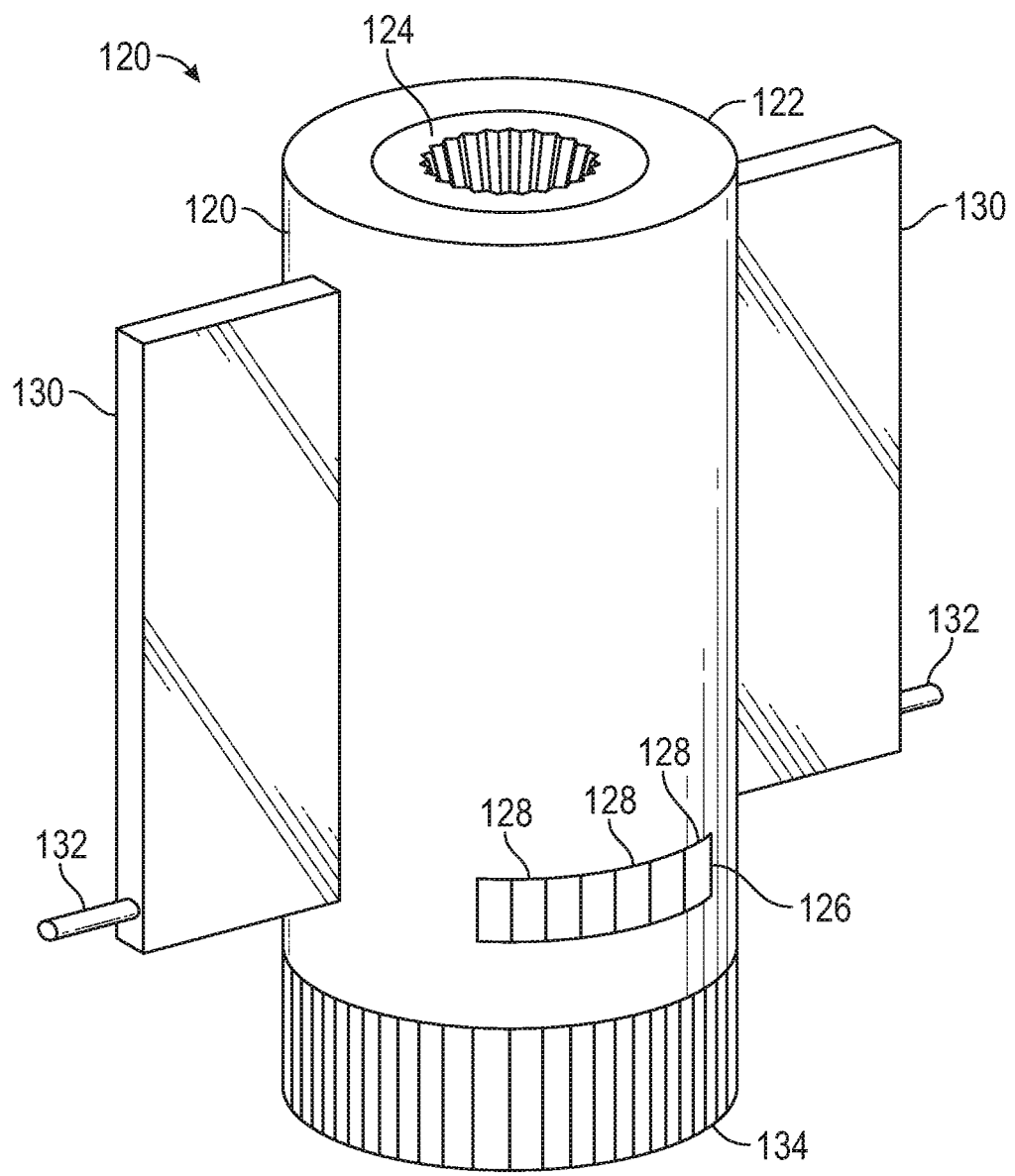
FIG. 2 is a perspective view of a pivoting motor mount used in the blender assembly shown in FIG. 1.

Referring to FIG. 2, blender motor assembly 120 includes a housing 122 that contains a motor (not shown) for operating blender assembly 100. The motor is operatively coupled to a rotating clutch 124 that engages with a rotating clutch (not shown) on the bottom of blender container 110 in order to rotate a blade (not shown) inside blender container 110. A motor control button panel 126 is mounted on housing 122 and contains a plurality of buttons 128 that are used to control the motor.

Blender motor assembly 120 also includes a pair of side flanges 130 that extend outwardly from housing 122. Side flanges 130 are generally elongate parallelepiped members that extend diametrically opposite from each other. Side flanges 130 are used to engage with pivot base 150 in order to effect a desired "banging" of blender motor assembly 120 against pivot base 150 in order to knock food loose that may be stuck to the side wall of blender container 110. A pivot pin 132 extends outwardly from the base of each flange 130.

Pivot pins 132 are axially aligned and each pivot pin 132 extends into pivot base 150, allowing blender motor assembly 120 to pivot relative to pivot base 150.

Bottom portion 134 of blender motor assembly 120 can be weighted such that the center of gravity of blender motor assembly 120 is at or below the vertical height of pivot pins 132, such that, in an unbiased position, blender motor assembly 120 extends generally in a vertical position, with bottom portion 134, being located vertically below rotating clutch 124. The motor (not shown) can be located toward bottom portion 134 to assist in providing the desired weight.

In an alternative embodiment, bottom portion 134 of blender motor assembly 120 can be weighted such that, in addition to the center of gravity of blender motor assembly 120 being at or below the vertical height of pivot pins 132, the center of gravity is located forward of pivot pins 132, toward motor control button panel 126, such that, in an unbiased position, blender motor assembly 120 is pivoted such that blender container 110 is angled toward the user, enabling the user to look into blender container 110 without having to lean over blender assembly 100.

Figure 3:
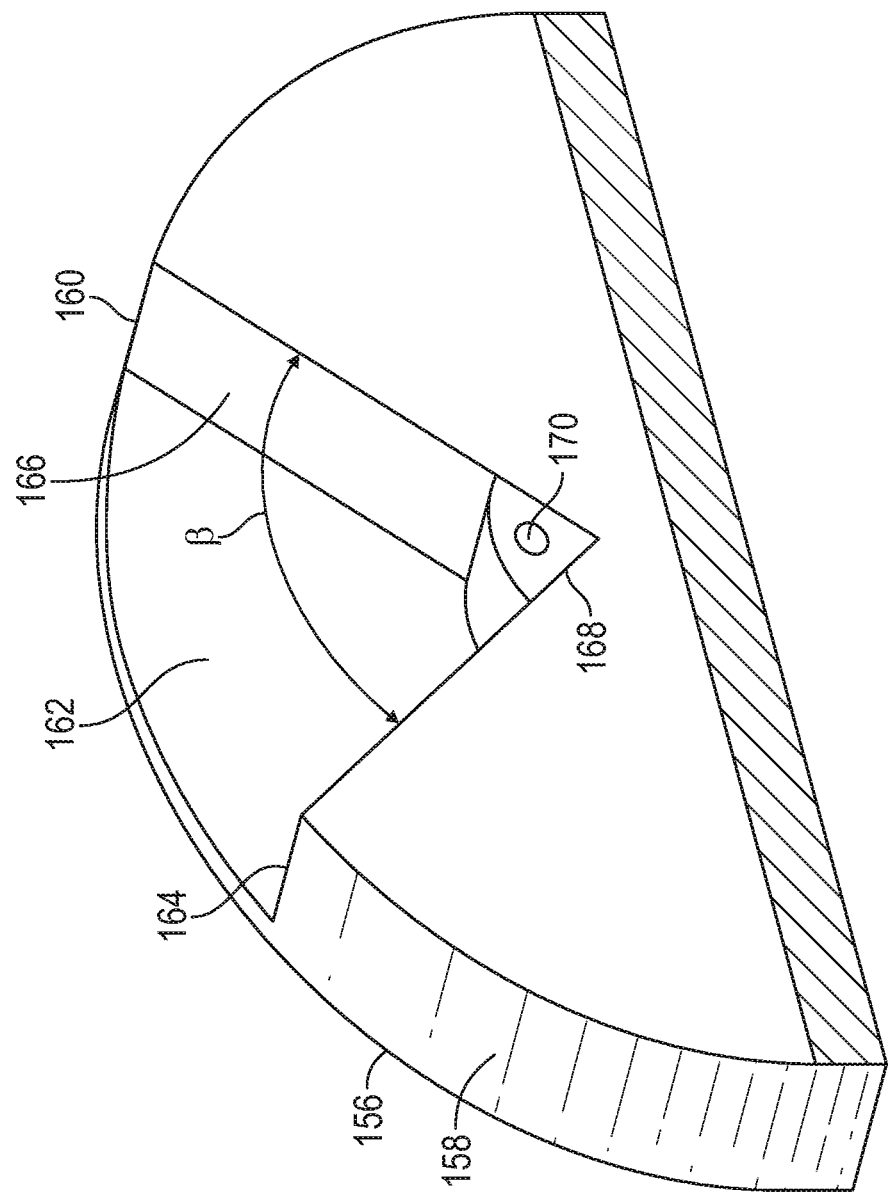
FIG. 3 is a side elevational view of a motor mount, partially in section, of the pivot stand, taken along lines 3-3 of FIG. 1.
Figure 4:
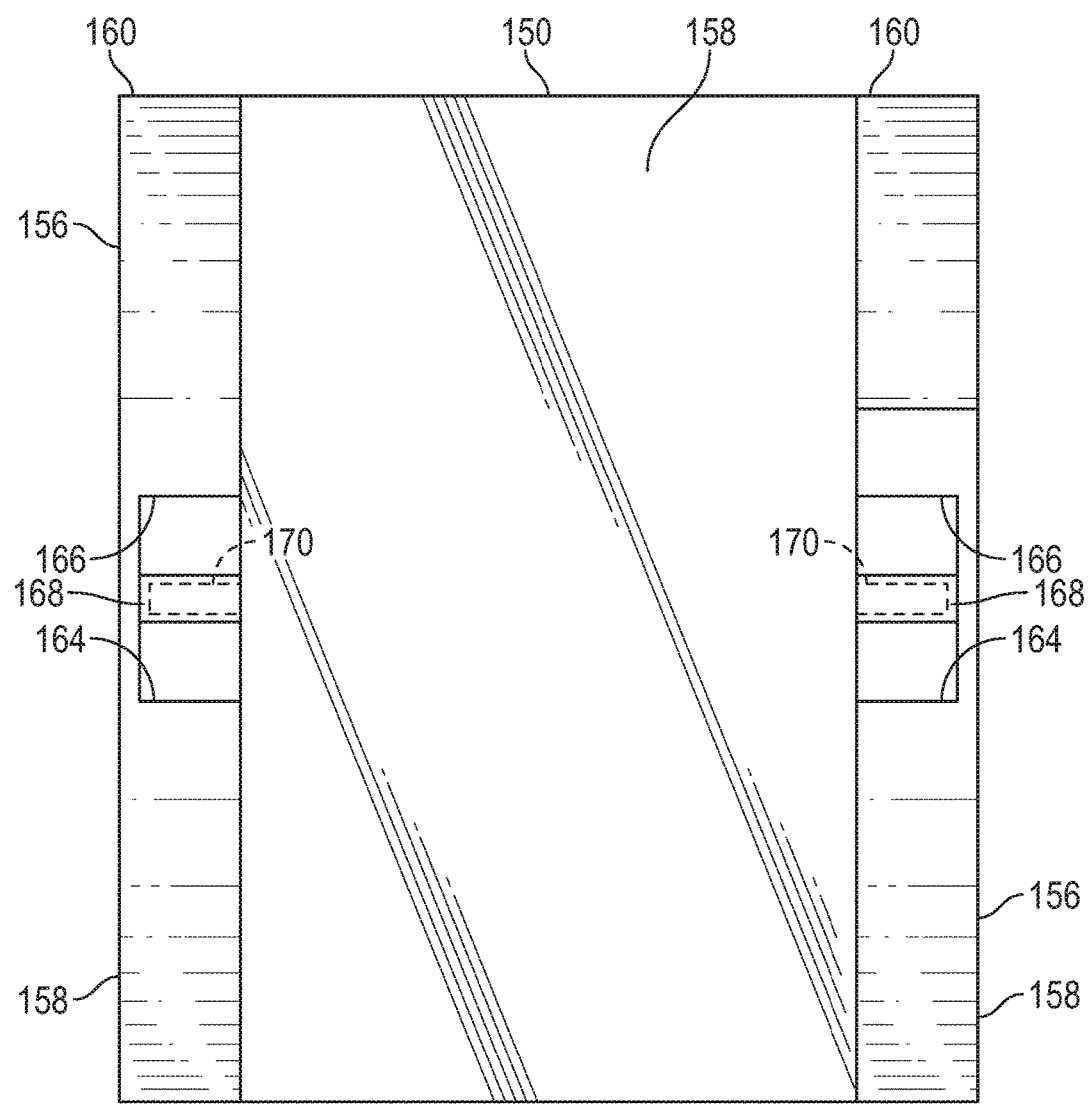
FIG. 4 is a top plan view of the motor mount used in the blender assembly shown in FIG. 1.
Figure 5:
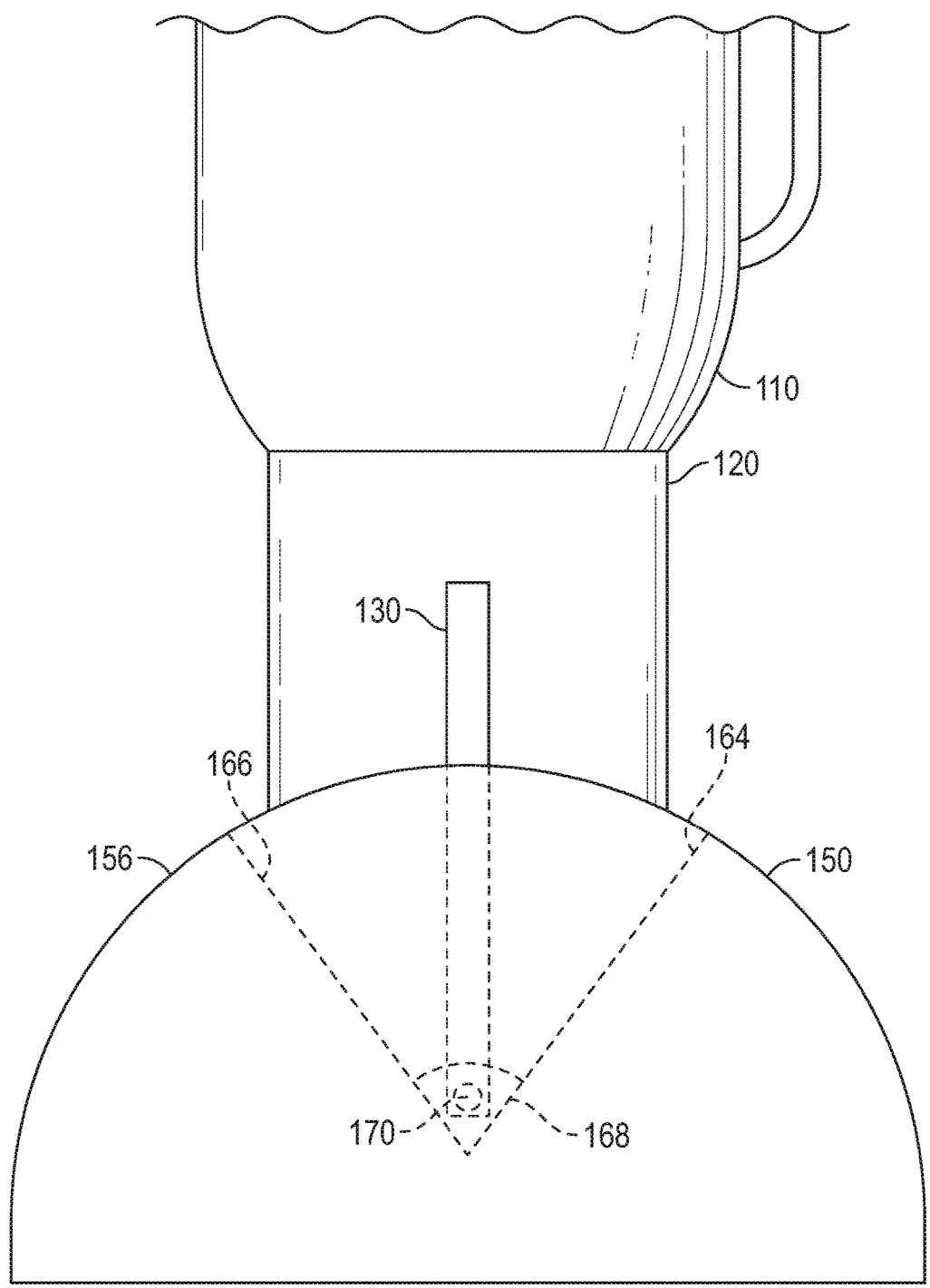
FIG. 5 is a side elevational view of the blender assembly shown in FIG. 1.

Referring to FIGS. 3 and 4, pivot base 150 is shown. Pivot base 150 has a generally U-shaped configuration, with a base portion 152 having a flat bottom surface 154 adapted to allow blender assembly 100 to sit on a flat, planar surface. A pair of generally parallel, upright extending sidewalls 156. Each extends upwardly from bottom surface 154. Space 158 between the two sidewalls 156 is sized to allow blender motor assembly 120 to freely fit therebetween.

As shown in FIG. 3, each sidewall 156 includes a front portion 158 and a rear portion 160, with a generally "V-shaped" notch 162 formed therebetween. Notch 162 is formed by a front stop 164 and a rear stop 166 that extend downward at an angle β relative to each other such that front stop 164 and rear stop 166 restrict the pivoting of blender motor assembly 120 with respect to base 150. Blender motor assembly 120 can pivot no more than about β/2 degrees from the vertical. In an exemplary embodiment, angle β can be about 45° and angle β/2 is about 22.5°, although those skilled in the art will recognize that angle β can be other angles as well.

A pivot mount 168 is located at the confluence of front stop 164, and 166 includes a pivot pin hole 170 into which a pivot pin 132 is inserted. With blender motor assembly 120 inserted into pivot base 150, as shown FIG. 1, each flange 130 is located within notch 162, with a top portion of flange 130 extending upwardly above its respective sidewall 156.

To operate blender assembly 100, blender container 110 is inserted onto clutch 124 on top of blender motor assembly 120. Food/liquid is added to blender container 110 and a lid (not shown) is placed over top of blender container 110. A user selects a desired button 128 on motor control button panel 126 to start the motor and blend the food within blender container 110.

Figure 6:
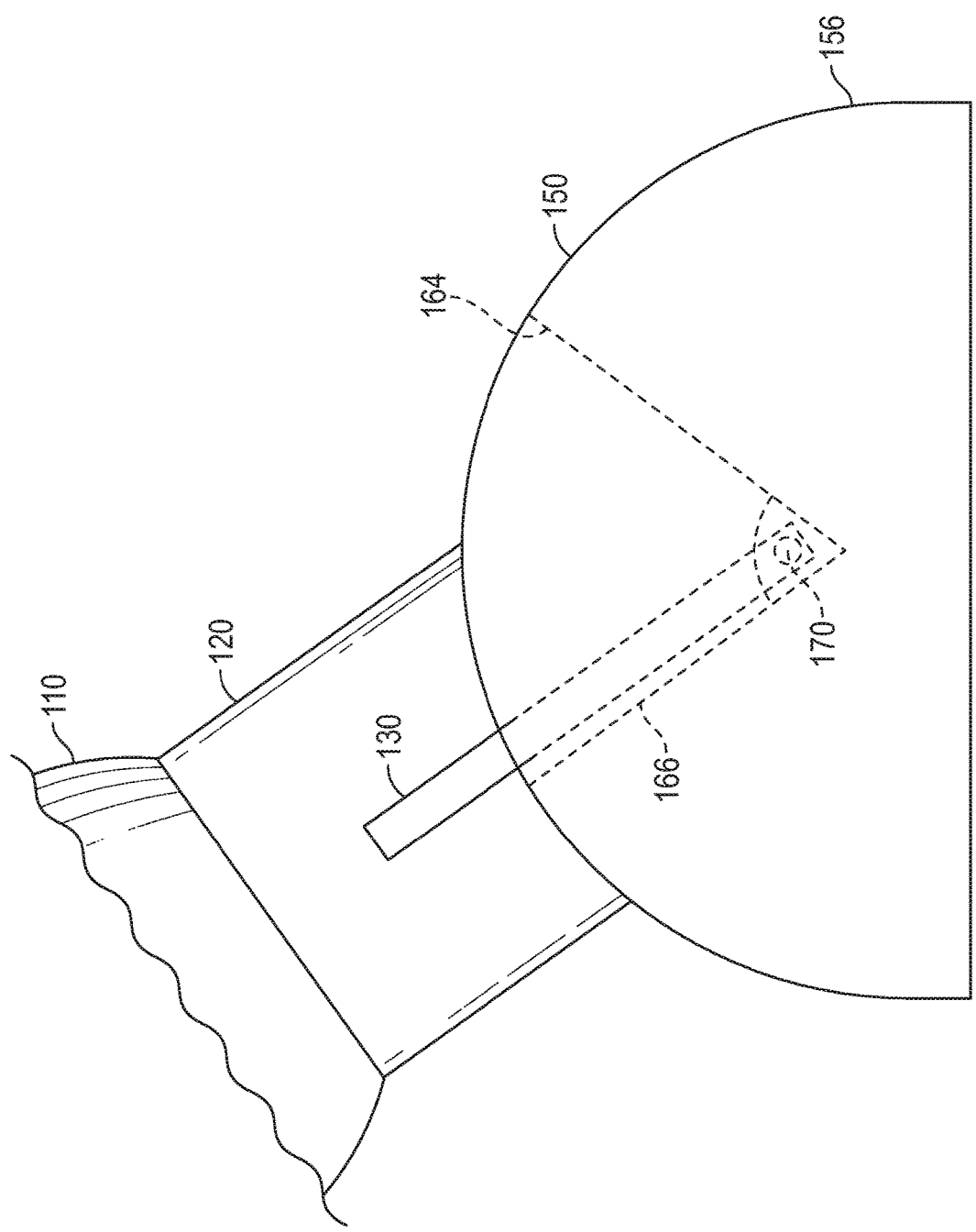
FIG. 6 is a side elevational view of the blender assembly shown in FIG. 1, with the blender pivoted in a backwards position.

As the food/liquid is being blended, the user grips at least one of the flanges 130 above sidewall 156 and rocks flange 130 back and forth in a forward-to-backward motion, alternatively banging flange against front stop 164, and rear stop 166 to dislodge any food product that may be stuck on the sidewall of blender container 110 or possibly wedged underneath the cutting blade within blender container 110. FIG. 6 shows blender container 110 with blender motor assembly 120 pivoted against rear stop 166.

When the food inside blender container 110 is sufficiently blended, the user stops rocking flange 130, and pushes a "Stop" button 128 on motor button control panel 126.

Figure 7:
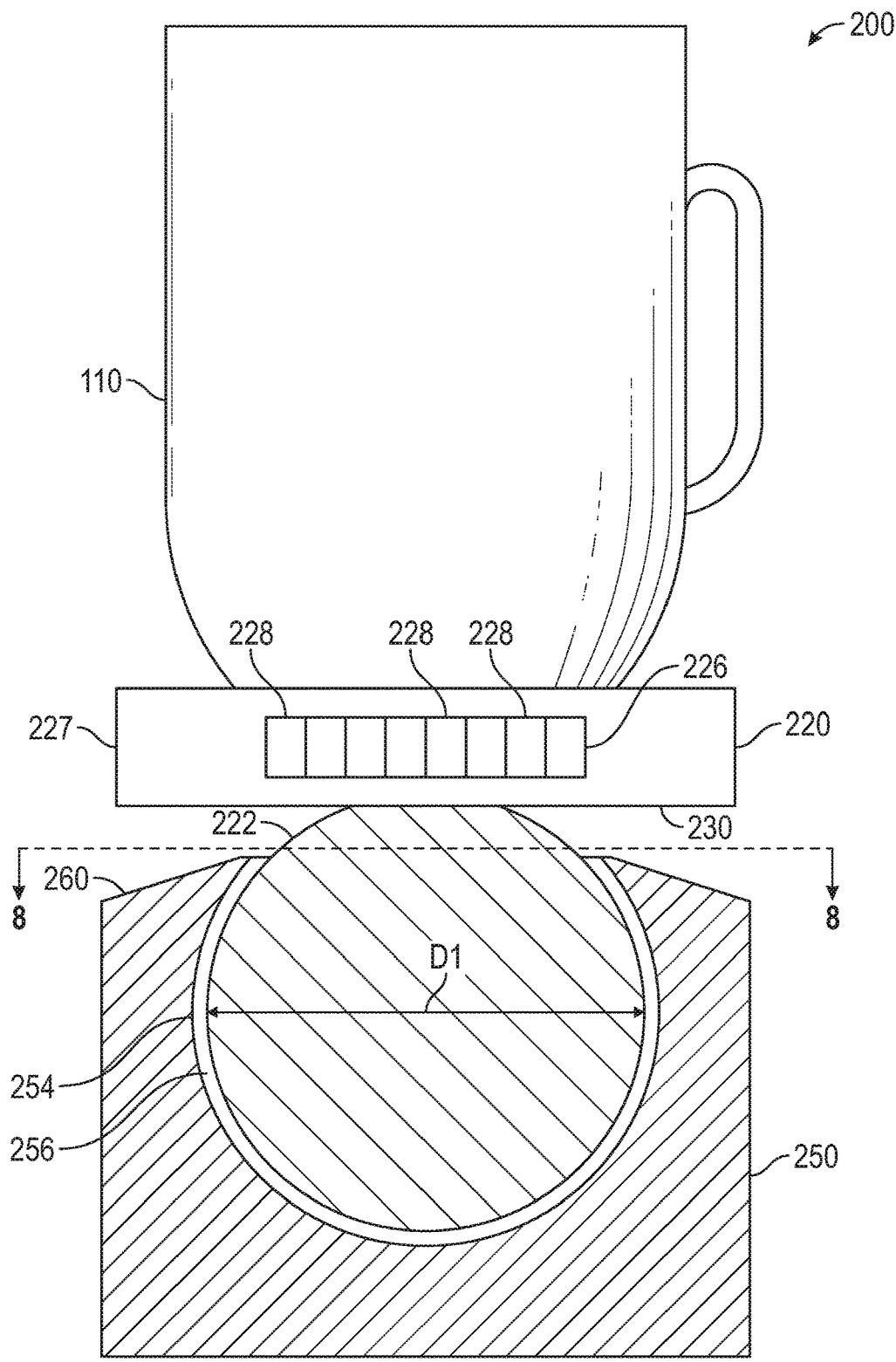
FIG. 7 shows a front elevational view, partially in section, of a blender assembly mounted on a pivot base according to a second exemplary embodiment of the present invention.
Figure 8:
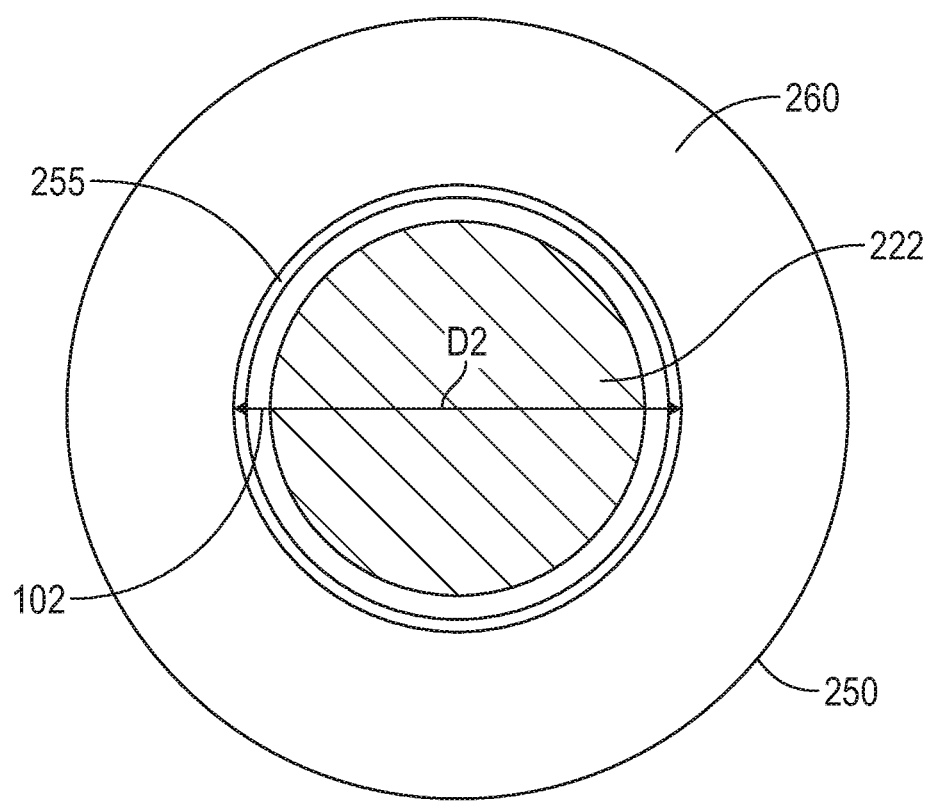
FIG. 8 shows a sectional view of the blender assembly shown in FIG. 7, taken along lines. 8-8 of FIG. 7.
Figure 9:
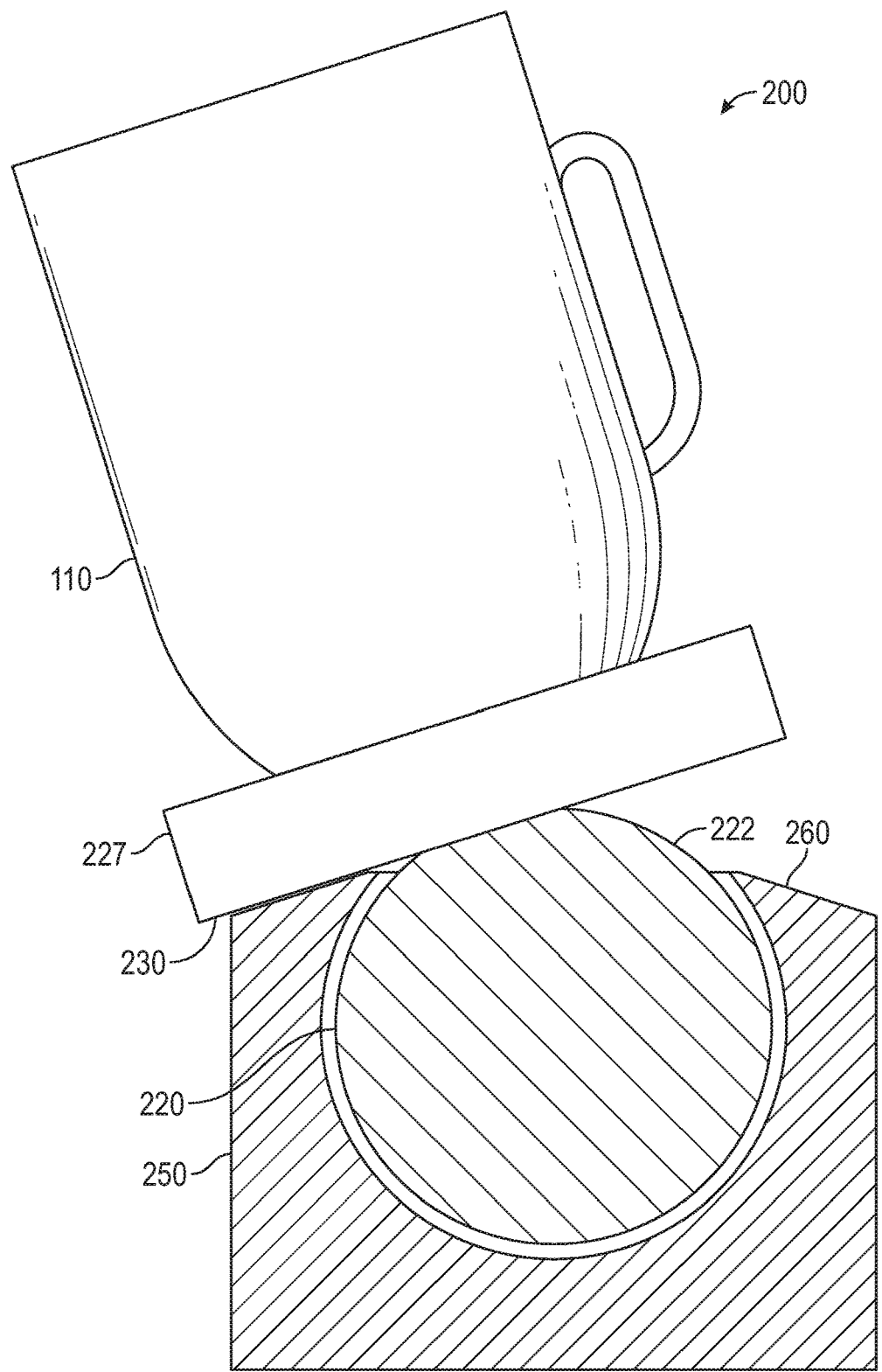
FIG. 9 shows a side elevational view, partially in section, of the blender assembly shown FIG. 7, with the blender pivoted in a backwards position.
Figure 10:
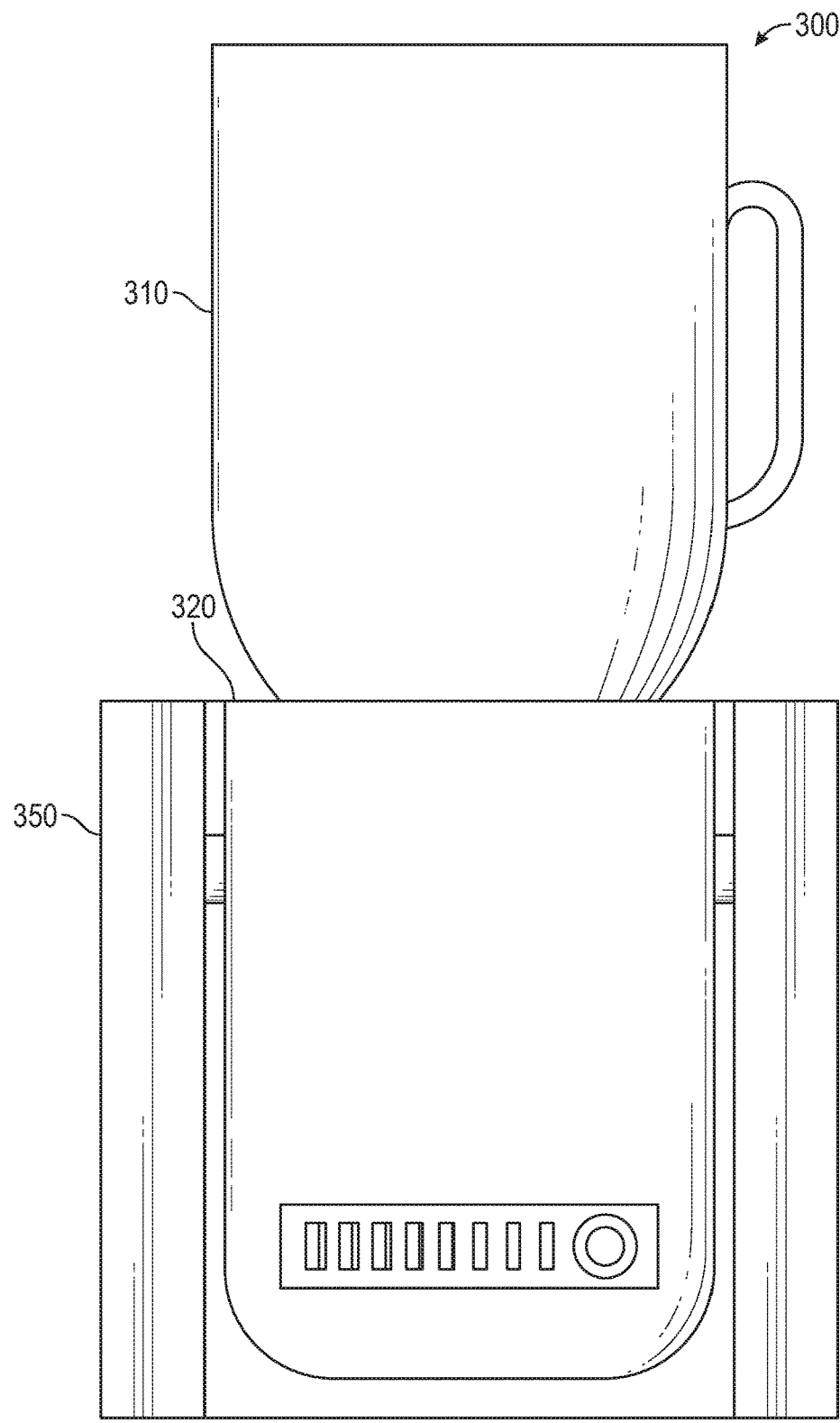
FIG. 10 is a front elevational view of a blender assembly mounted on a pivot base according to a third exemplary embodiment of the present invention.
Figure 11:
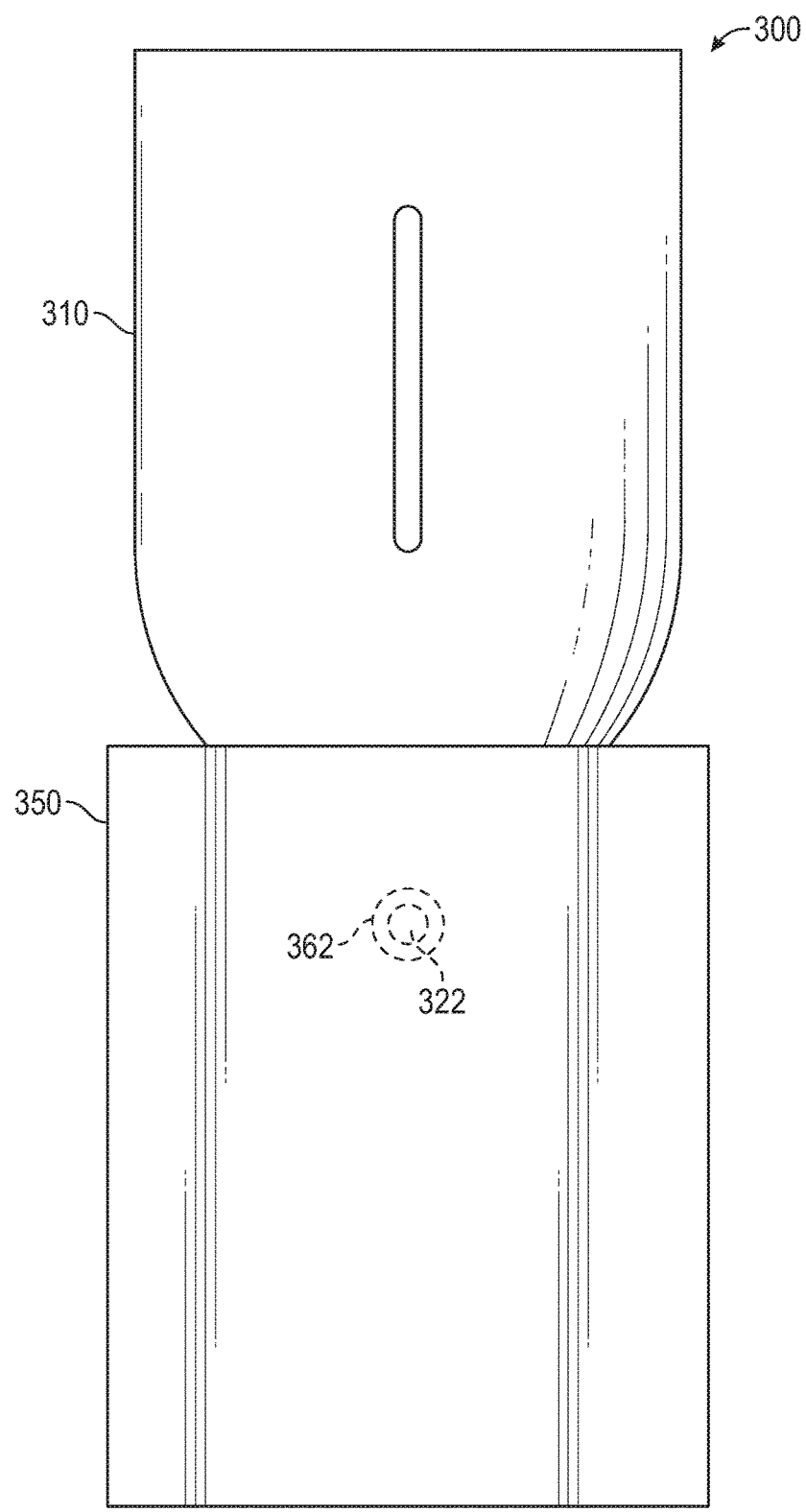
FIG. 11 is a side elevational view of the blender assembly shown in FIG. 10.

Referring to FIGS. 7-9, a blender assembly 200 according to a second exemplary embodiment of the present invention is shown. Blender assembly 200 includes a pivoting mechanism that allows the user to rock the blending portion of blender assembly 200 in infinite directions and to forcefully engage the blending portion with a hard stop to knock loose any food particles that may be attached to the sidewalls of the blender container.

Blender assembly 200 includes blending portion 102 that includes blender container 110 releasably mountable onto a pivoting blender motor assembly 220.

Pivoting blender motor assembly 220 is pivotally mounted onto a pivot base 250. Pivot base 250 can be mounted on a flat surface, such as, for example, a tabletop. In a commercial environment, pivot base 250 can be fixedly mounted to the flat surface, although those skilled in the art will recognize that pivot base 250 can be removably placed on the flat surface.

Referring to FIG. 7, blender motor assembly 220 includes a housing 222 that contains a motor (not shown) for operating blender assembly 200. A motor control button panel 226 is mounted on a platform 227, located directly above housing 222 and contains a plurality of buttons 228 that are used to control the motor. Housing 222 is generally ball-shaped and has a diameter D1, and can be constructed from and/or coated with a low-friction material, such as, for example, nylon. Platform 227 has a lower engagement surface 230 that engages a top surface 260 of pivot base 250 when blender motor assembly 220 is pivoted relative to pivot base 250.

Pivot base 250 includes a curved, concave pivot surface 254 that extends over an arc of greater than 180° and, preferably, greater than about 220°, forming an opening 255 having a diameter D2, which is smaller than D1 such that housing 222 cannot be removed from pivot base 250. Pivot surface 254 has diameter D1 sufficiently large to accommodate housing 222, yet allows housing 222 to rotate freely within a space 256 defined by pivot surface 254.

Similar to housing 222, pivot surface 254 can be constructed from and/or coated with a low friction material, such as, for example, nylon. The low friction surfaces of housing 222 and/or pivot surface 254 allow blender motor assembly 222 pivot freely along any orientation relative to pivot base 250.

A top surface 260 of pivot base 250 is beveled concentrically around its outer perimeter to provide a frustoconical top surface, thereby allowing blender container 110 to pivot with blender motor assembly 220 in any direction relative to the vertical, as shown FIG. 9.

Housing 222 of blender motor assembly 220 can be weighted such that the center of gravity of blender motor assembly 220 is at or below the geometric center of housing 222, such that, in an unbiased position, blender motor assembly 220 extends generally in a vertical position.

In operation, blender container 110 is inserted onto blender motor assembly 220. Food/liquid is added to blender container 110 and a lid (not shown) is placed over top of blender container 110. A user selects a desired button 228 on motor control button panel 226 to start the motor and blend the food within blender container 110.

Lower engagement surface 230 can be banged against pivot surface 254 in order to shake loose food particles that may be stuck inside blender 110. Alternatively, blender 110 and blender motor assembly 220 can be pivoted such that lower engagement surface 230 engages pivot surface 254 and then blender 110 can be rotated such that lower engagement surface 230 slides around the perimeter of pivot surface 254.

When the food inside blender container 110 is sufficiently blended, the user rotates blender and blender motor assembly 220 to a vertical position, and pushes a "Stop" button 228 on motor button control panel 226.

A third exemplary embodiment of a pivoting blender assembly 300 according to the present invention is shown in FIGS. 10-14. Blender assembly 300 includes a blender 310 releasably mounted on a blender motor assembly 320. Blender motor assembly 320 is pivotally mounted onto a pivot base 350 such that blender 310 and motor assembly 320 can pivot in only a single plane, in a front-to-back direction.

Figure 12:
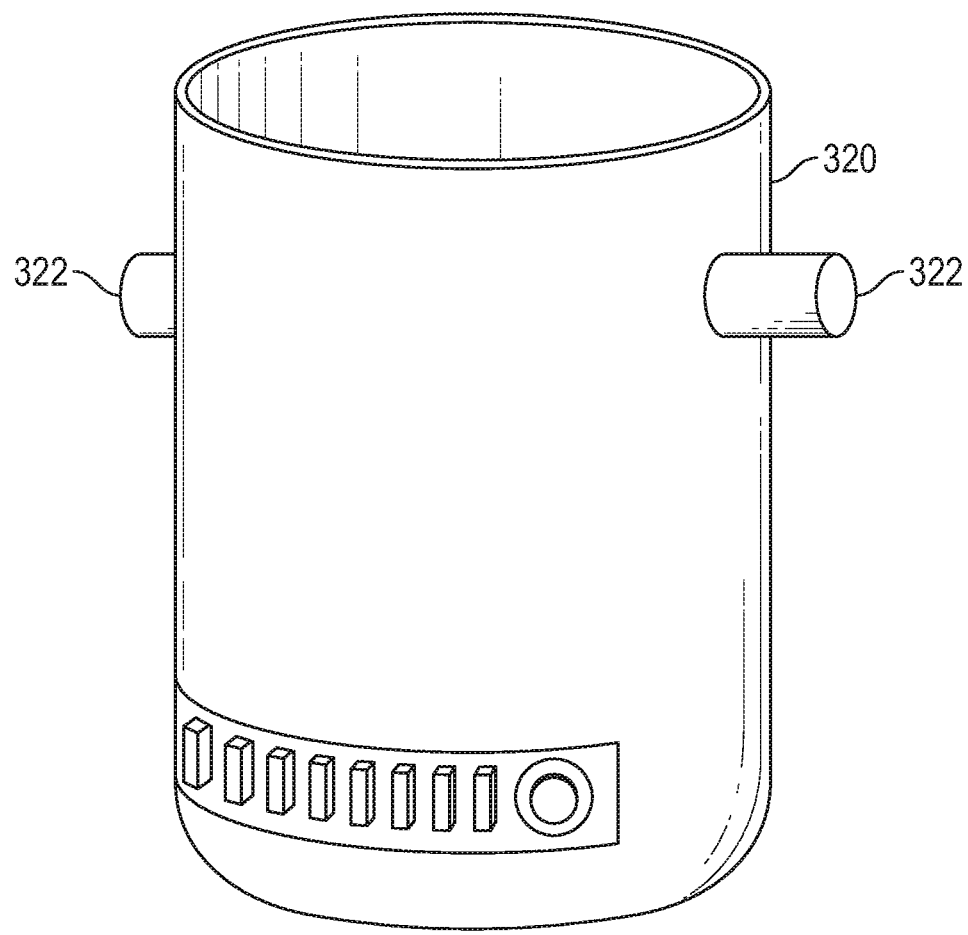
FIG. 12 is a perspective view of a blender motor for use with the blender assembly shown in FIG. 10.

Referring to FIG. 12, motor assembly 320 includes a pair of axially aligned pivot pins 322 that each extend outwardly from motor assembly 320. Each pivot pin 322 extends into pivot base 350, allowing blender motor assembly 320 to pivot relative to pivot base 350.

Figure 13:
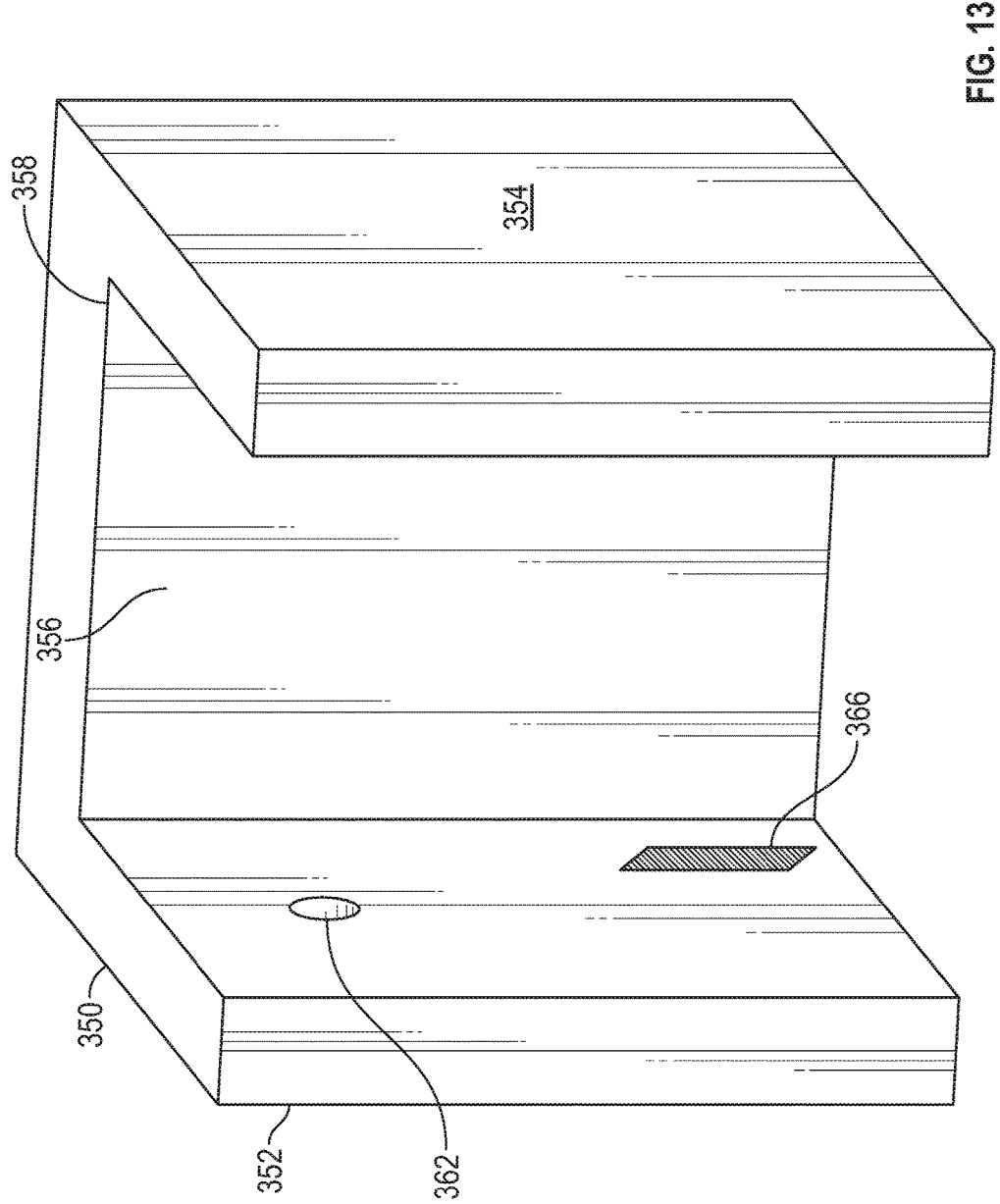
FIG. 13 is a perspective view of a pivot base for use with the blender assembly shown in FIG. 10.

Pivot base 350 is shown in FIG. 13. Pivot base 350 is generally U'shaped, with a left side wall 352, a right side wall 354, and a rear wall 356. Rear wall 356 includes an engagement surface 358. Engagement surface 358 is used to engage either blender 310 or motor assembly 320 during pivoting of blender 310 and motor assembly 320 and act as a stop. While engagement surface 358 is shown in FIG. 13 as an edge, those skilled in the art will recognize that engagement surface 358 can be beveled, similar to top surface 260 of pivot base 250, as described above.

A front of base 350 is open to allow motor assembly 320 to pivot. Each side wall 352, 354 includes a receiver 362, 364 respectively (receiver 362 shown in FIG. 11) that is aligned and sized to accept a pivot pin 322 so that motor assembly 320 can pivot on pivot base 350.

At least one flange 366 extends outwardly from one of side walls 352, 354 inwardly into pivot base 350. Flange 366 is located below receivers 362, 364 and is between receivers 362, 364 and rear wall 356 so that motor assembly 320 cannot be pivoted toward rear wall 356. Flange 366 acts as a stop to prevent pivoting motor assembly 320 in that direction. While a single flange 366 is shown extending from left side wall 352, those skilled in the art will recognize that flange 366 can extend from right side wall 354, or both side walls 352, 354.

Figure 14:
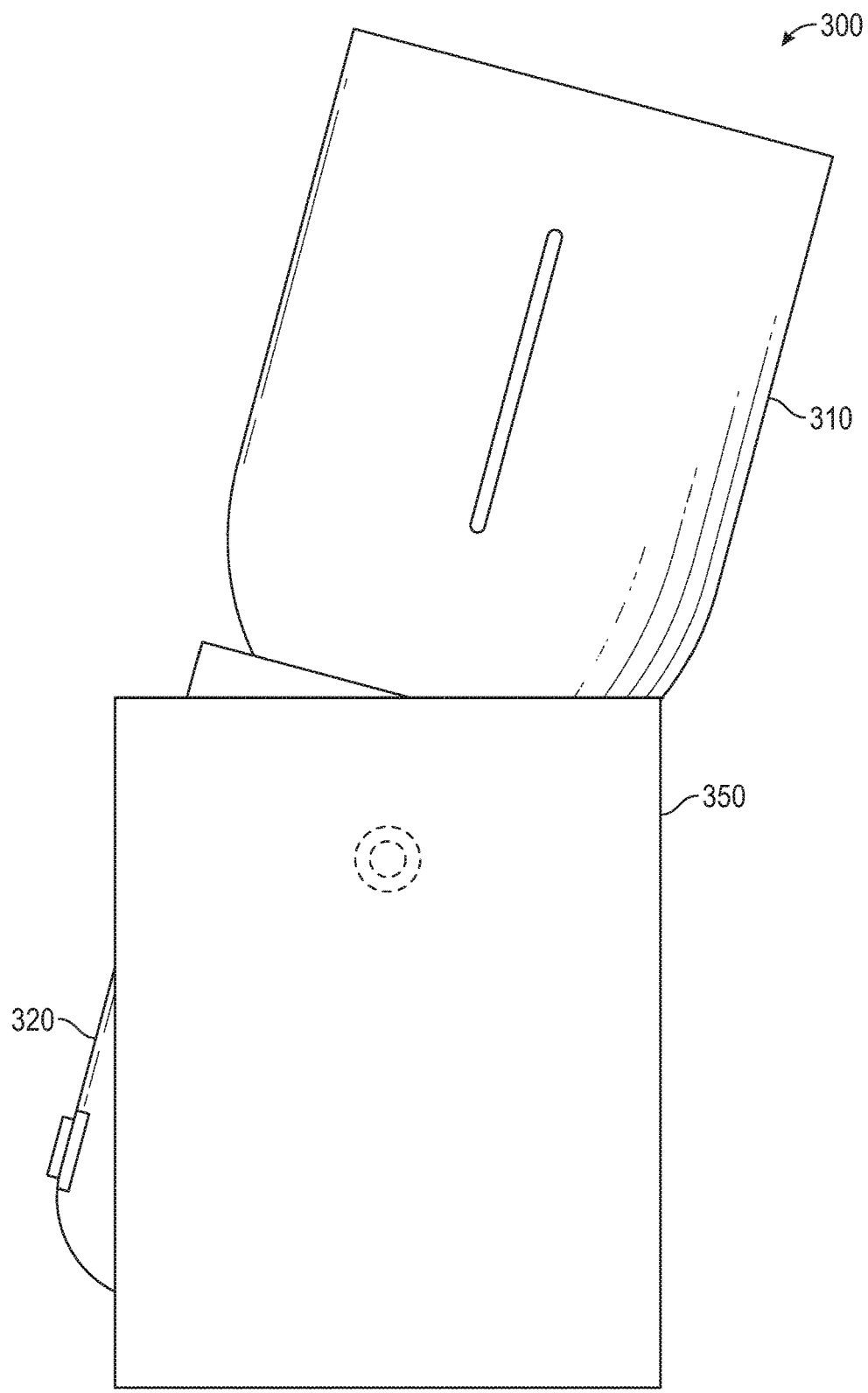
FIG. 14 is a side elevational view of the blender assembly shown in FIG. 10, with the blender and blender motor in a pivoted position.

The degree of pivoting of blender 310 and motor assembly 320 depends on the distance of engagement surface 358 from receivers 362, 364, as well as the height of rear wall 356. A shorter distance between receivers 362, 364 and/or a higher height of rear wall 356 results in less pivot ability, while a greater distance between receivers 362, 364 and/or a lower height of rear wall 356 results in more pivot ability. In an exemplary embodiment, as shown in FIG. 14, blender 310 and motor assembly 320 can pivot between about 20 degrees and about 45 degrees between flange 366 and engagement surface 358.

Figure 15:
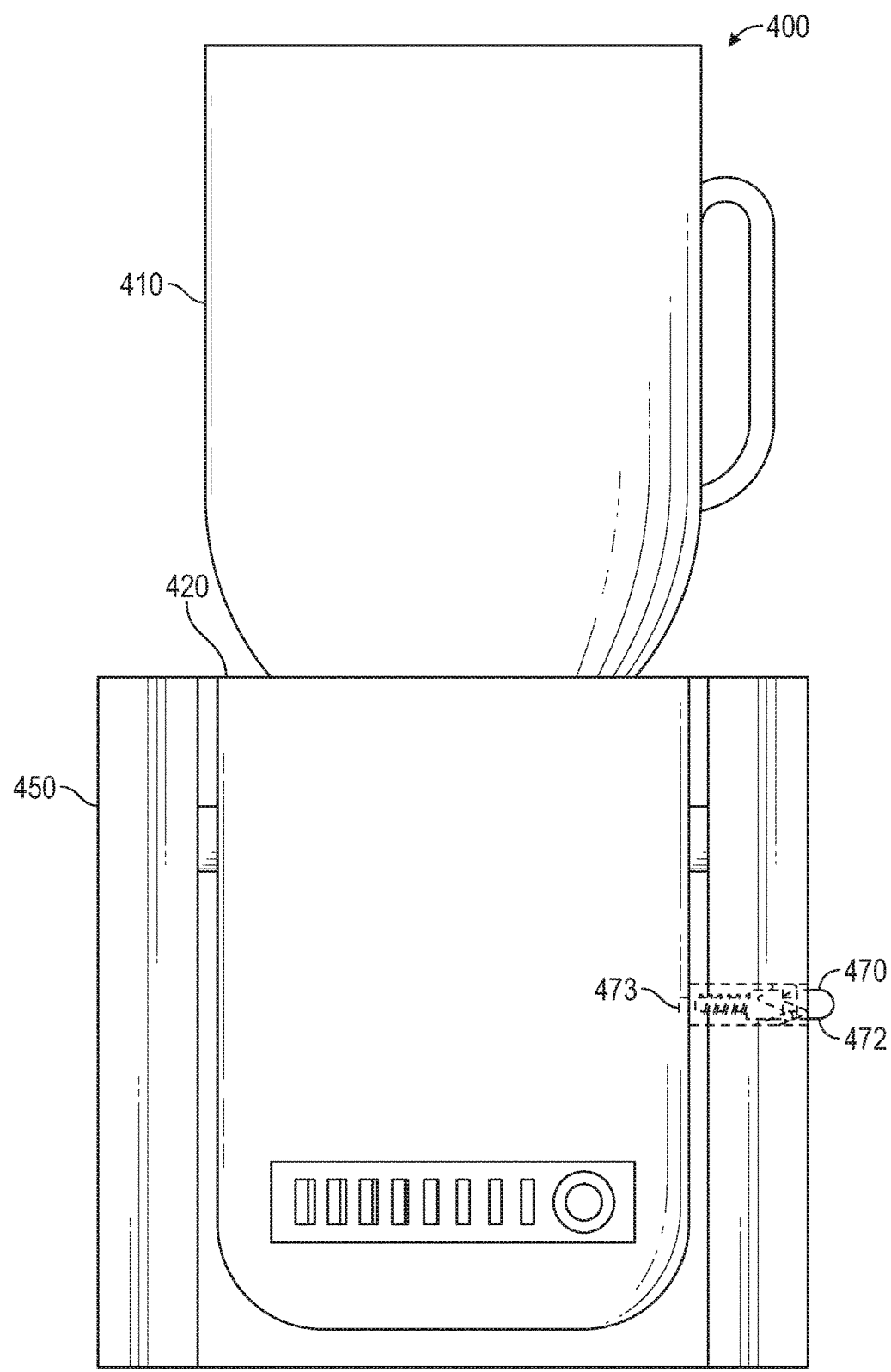
FIG. 15 is a front elevational view of a blender assembly mounted on a pivot base according to a fourth exemplary embodiment of the present invention, with the base disengaged from the blender motor assembly.
Figure 16:
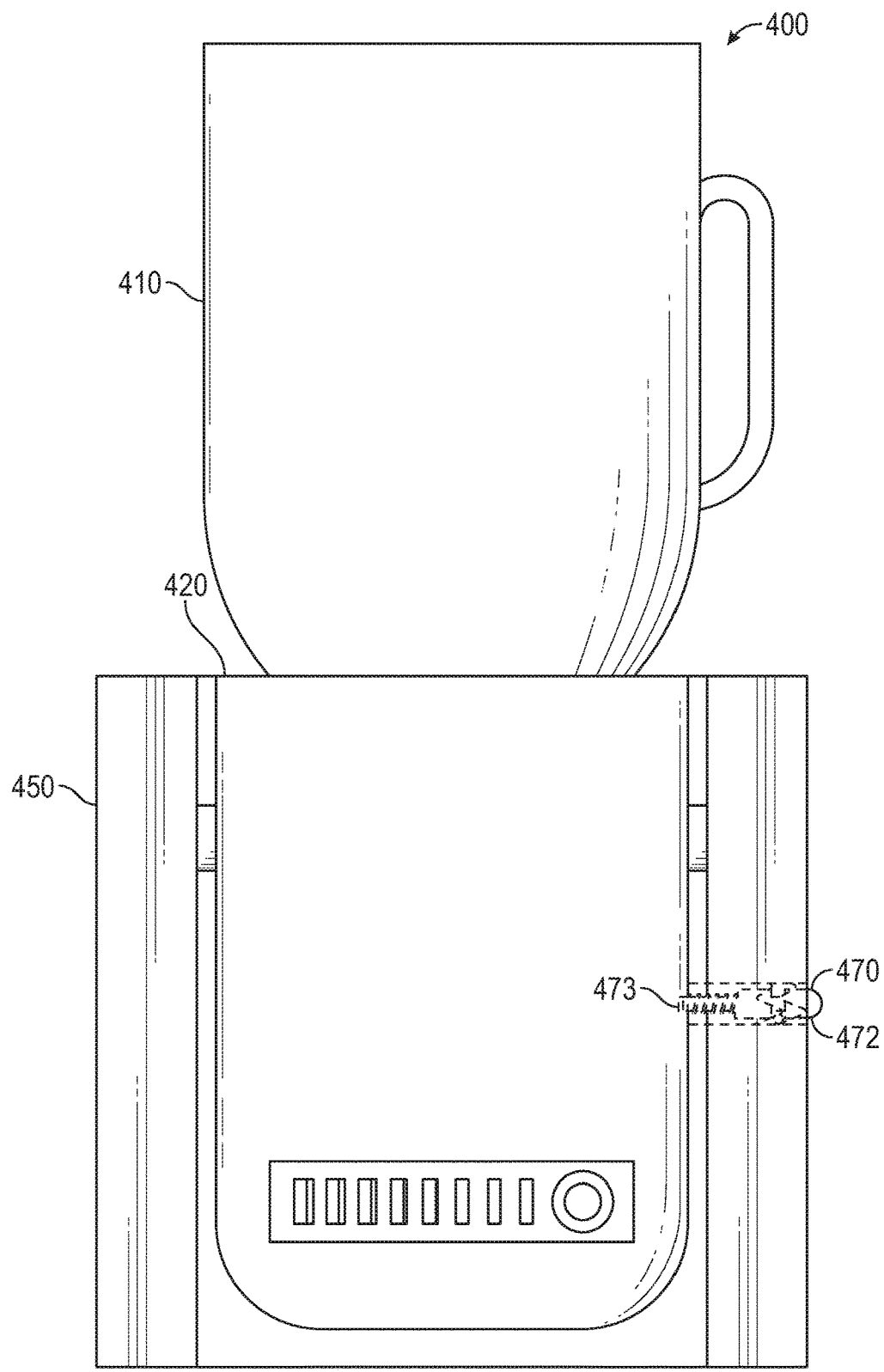
FIG. 16 is a front elevational view of the blender assembly shown in FIG. 15, with the base engaged with the blender motor assembly.

An alternative embodiment of a blender assembly 400 is shown in FIGS. 15-20. Assembly 400 is similar to assembly 100 with the addition of a locking mechanism 470 that releasably locks a blender motor assembly 420 to its respective base 450. In a locked position, blender motor assembly 420 and a blender container 410 mounted on blender motor assembly 420 can be fixed in a vertical position as shown in FIGS. 15 and 16. Locking mechanism 470 includes a button assembly 472 that can be pushed to alternately engage blender motor assembly 420 and disengage blender motor assembly 420. Locking mechanism 470 also includes a receiver 473 that is sized to receive button assembly 472 to lock blender motor assembly 420 to base 450.

Figure 17:
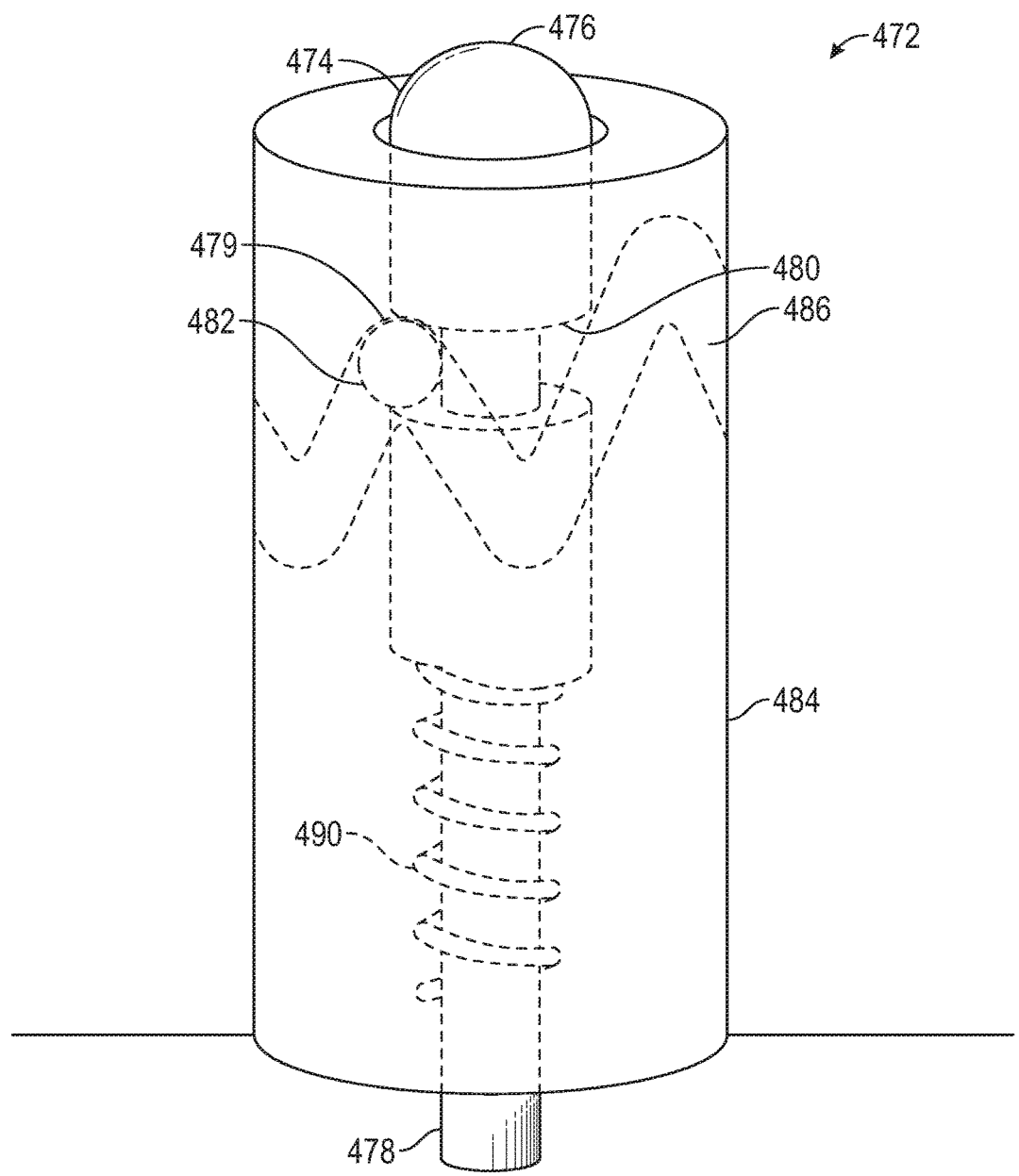
FIG. 17 is a perspective view of a button assembly used to releasably lock base to the blender motor assembly.
Figure 18:
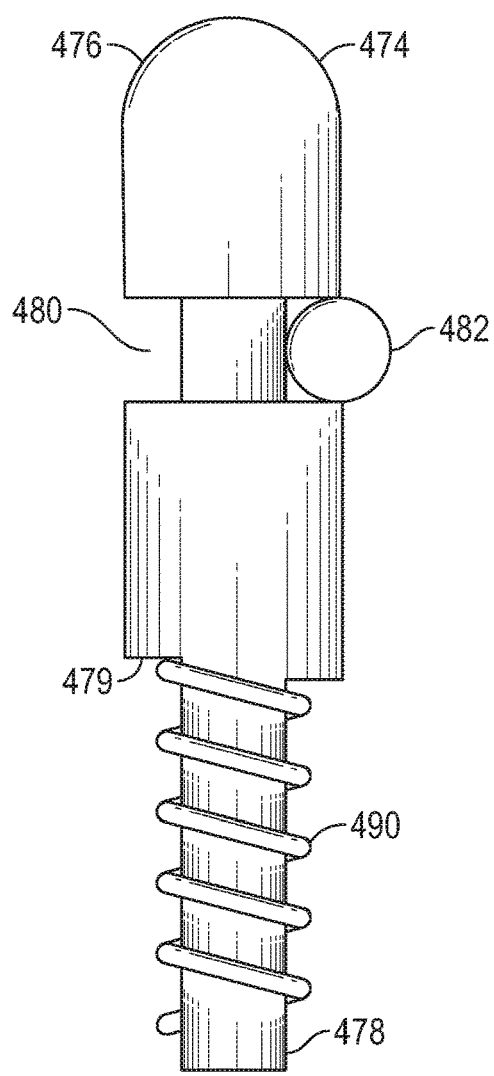
FIG. 18 is a side elevational view of a button and biasing member used in the button assembly shown in FIG. 17.

An exemplary button assembly 472 is shown in FIG. 17 and includes an elongate button 474 (shown in FIG. 18) having an external end 476 and an internal, blender motor assembly end 478. External end 476 has a larger diameter than blender motor assembly end 478 such that a lip 479 is formed at an intersection of external end 476 and blender motor assembly end 478.

Button 474 includes a circular groove 480 in which a ball 482 rolls as button assembly 472 is activated. Ball 482 is sized such that a portion of ball 482 extends outwardly of groove. 480.

Figure 19:
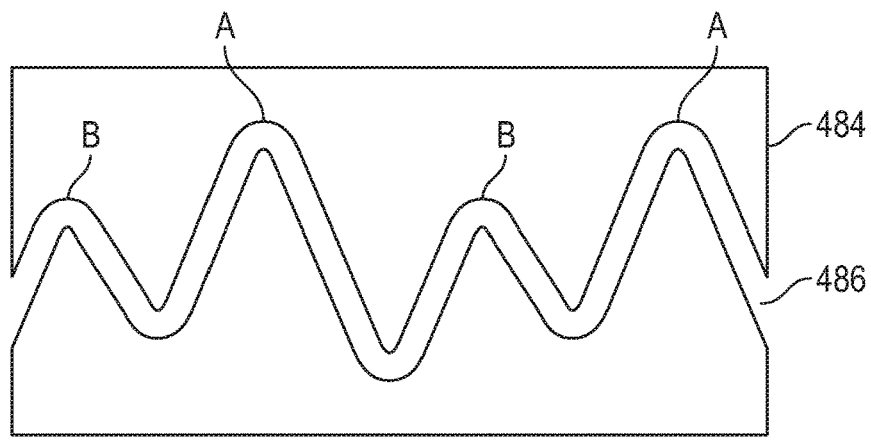
FIG. 19 is a side elevational view of a housing used with the button assembly shown in FIG. 17, opened up to show a cam profile.

Button 474 is inserted into a cylindrical outer housing 484 that has a cam groove 486 formed therein. Cam groove 486 is located such that the portion of ball 482 that extends outwardly of groove 480 rides in cam groove 486. An exemplary profile of cam groove 486 is shown in FIG. 19, although those skilled in the art will recognize that other profiles of cam groove 486 can be provided. A biasing member 490 in the form of a helical spring biases button 474 away from blender motor assembly 420. A first end of biasing member 490 engages lip 479 and a second end of biasing member 490 engages base 450.

When button 474 is pushed, ball 482 is forced around groove 480 by cam groove 486. When ball 482 is in either position "A", shown in FIG. 19, button 474 is in the disengaged position, with blender motor assembly end 478 extending outwardly of receiver 473 so that blender motor assembly 420 is disengaged from base 450 (FIG. 15). When button 474 is pushed again, ball 482 is forced around groove 480 by cam groove 486 to position "B", where button 474 is in the engaged position, with blender motor assembly end 478 extending into receiver 473 so that blender motor assembly 420 is fixed relative to base 450 (FIG. 16).

While button assembly 472 is shown, those skilled in the art will recognize that other types of assemblies such as, for example, a ballpoint pen push button assembly, can be used as well.

Figure 20:
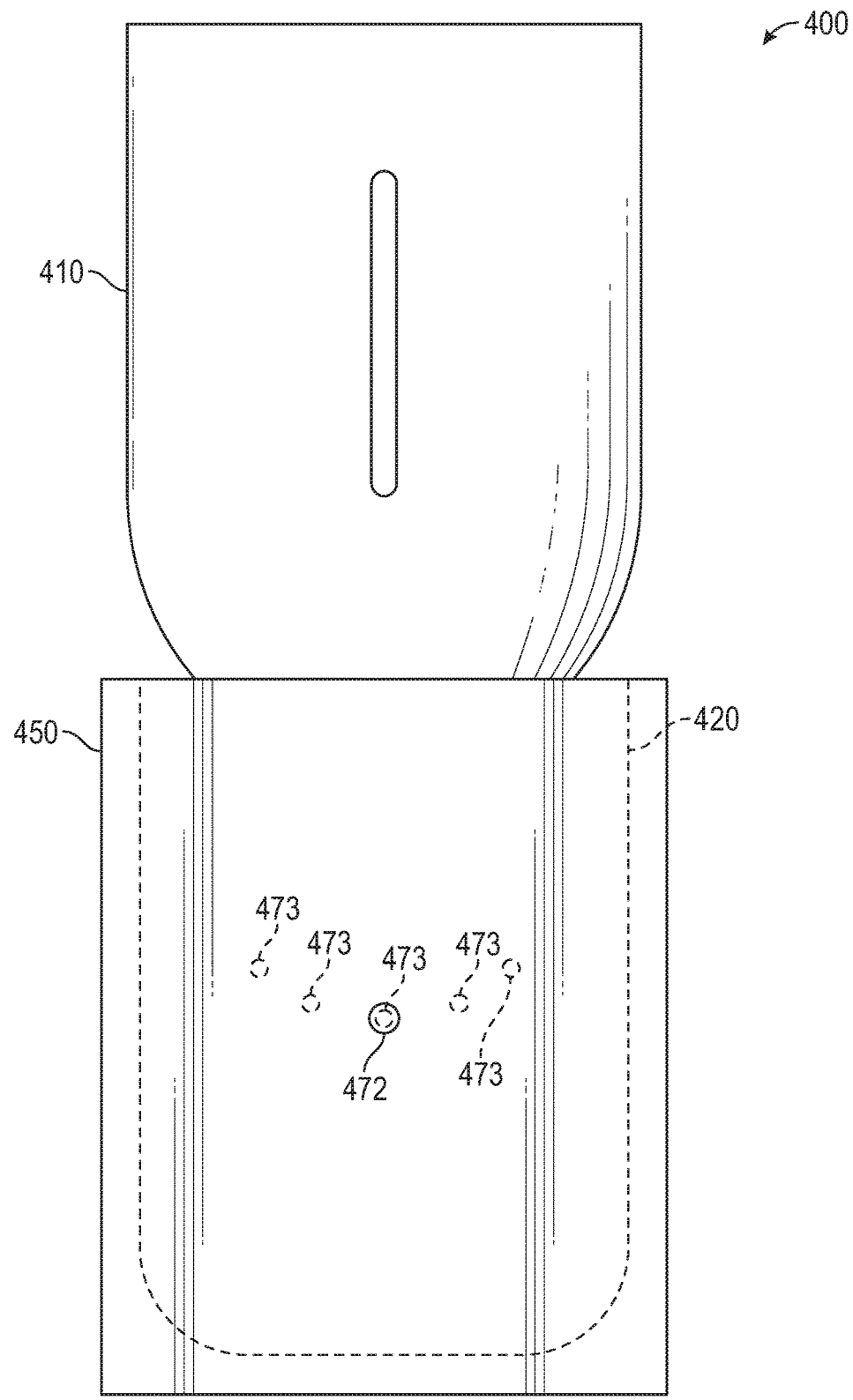
FIG. 20 is a side elevational view of the blender assembly shown in FIG. 15.

As shown in FIG. 20, base 420 can include a plurality of receivers 473 arranged in an arc so that, depending on which of the receivers 473 into which blender motor assembly end 478 is inserted, blender container 410 can be locked in a vertical position (as shown in FIG. 20) or, alternatively, blender container 410 can be angled vertically in a locked position with respect to base 420.

Figure 21:
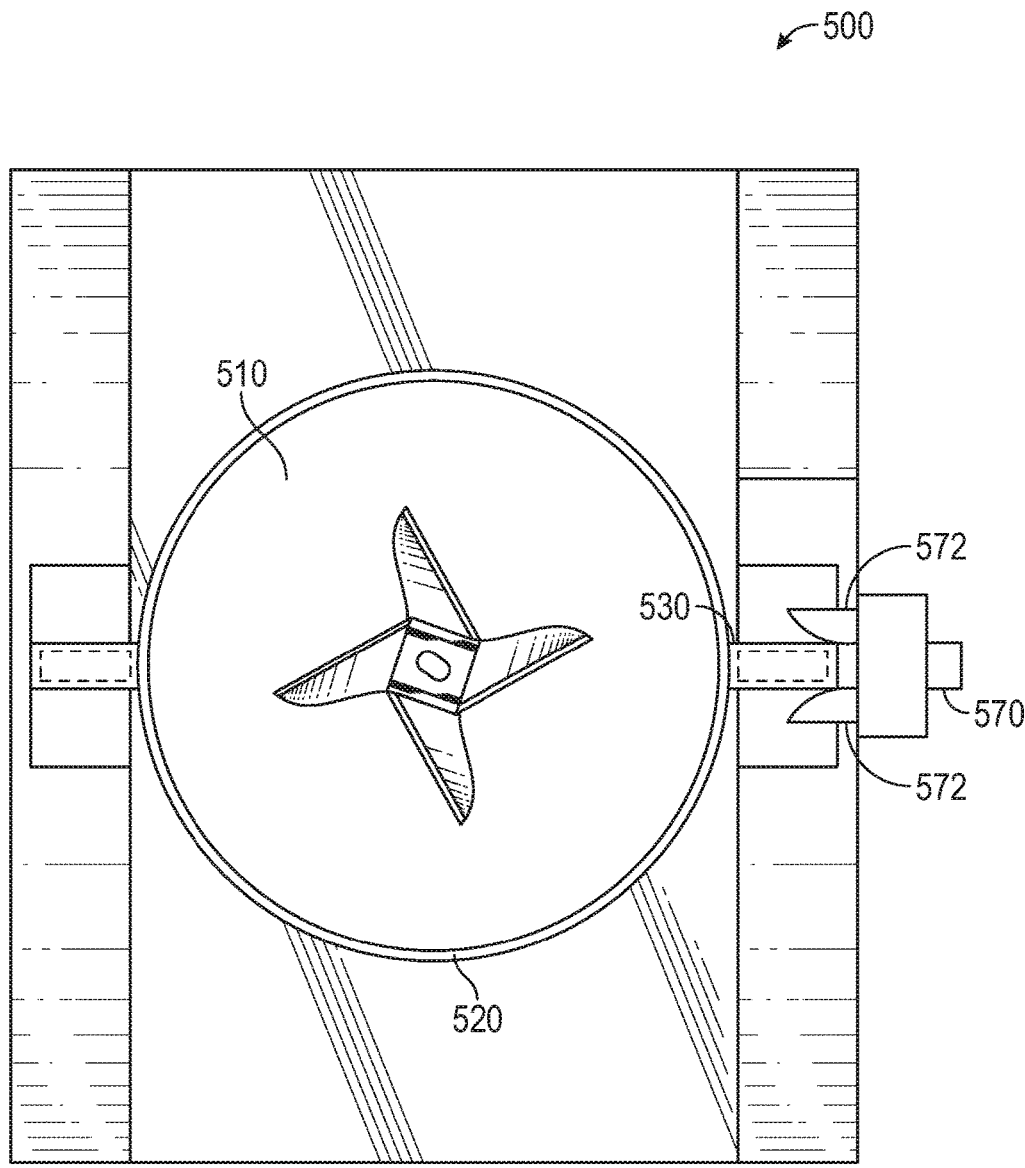
FIG. 21 is a top plan view of a blender assembly mounted on a pivot base according to a fifth exemplary embodiment of the present invention.

An alternative embodiment of a blender assembly 500 is shown in FIG. 21. Assembly 500 is similar to assembly 400 but includes a locking mechanism 570 that operates similarly to locking mechanism 470 discussed above. However, instead of locking mechanism 470 that uses a single blender motor assembly end 478, locking mechanism has two forked fingers 572 that extend on either side of a flange 530 to secure blender container 510 and blender motor assembly 520 in a vertical position. Forked fingers 572 are angled inward toward each other to allow for slight angulation of blender container 510 and blender motor assembly 520 away from the vertical as forked fingers 572 engage flange 530 and bring blender container 510 and blender motor assembly 520 to the vertical.

Figure 22:
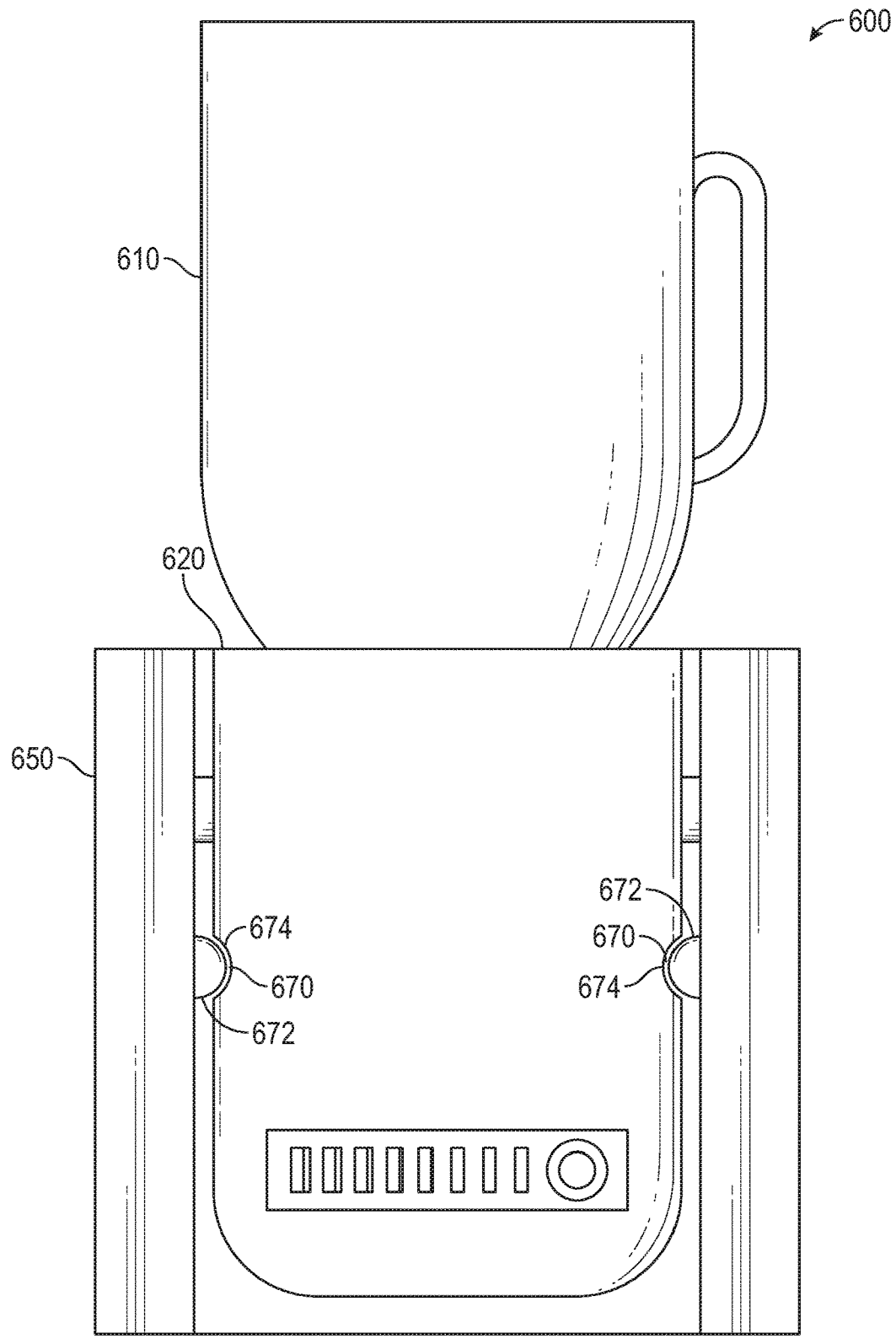
FIG. 22 is a front elevational view of a blender assembly mounted on a pivot base according to a sixth exemplary embodiment of the present invention.

An alternative embodiment of a blender assembly 600 is shown in FIG. 22. Assembly 600 is similar to assembly 100 with the addition of a locking mechanism 670 that releasably locks a blender motor assembly 620 to its respective base 650.

Locking mechanism 670 includes a nub 672 and a corresponding detent 674 into which nub 672 is releasably insertable. While two diametrically opposed locking mechanisms 670 are shown, those skilled in the art will recognize that a single locking mechanism 674 can be used. Locking mechanism 670 locks blender container 610 in a vertically upright position when nub 672 is inserted into detent. While nub 672 is large enough to engage into detent 674 to secure blender motor assembly 620 to its respective base 650, detent 672 is small enough such that a user can, with a minimal amount of effort, pivot blender container 610 so that nub 672 is released from detent 674, allowing blender container 610 and blender motor assembly 620 to pivot with respect to base 650.

Figure 23:
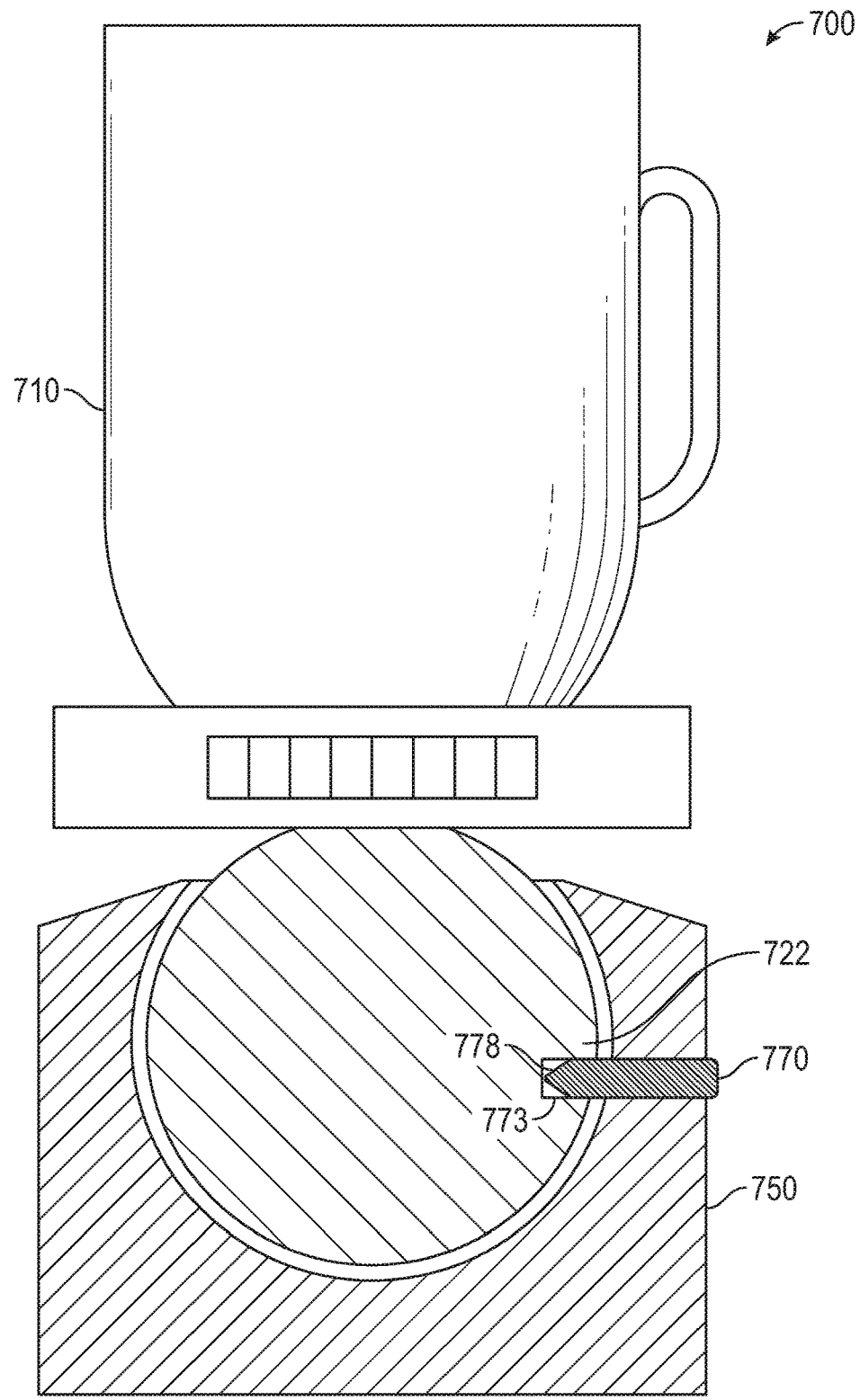
FIG. 23 is a front elevational view, partially in section, of a blender assembly mounted on a pivot base according to a seventh exemplary embodiment of the present invention in a locked position.
Figure 24:
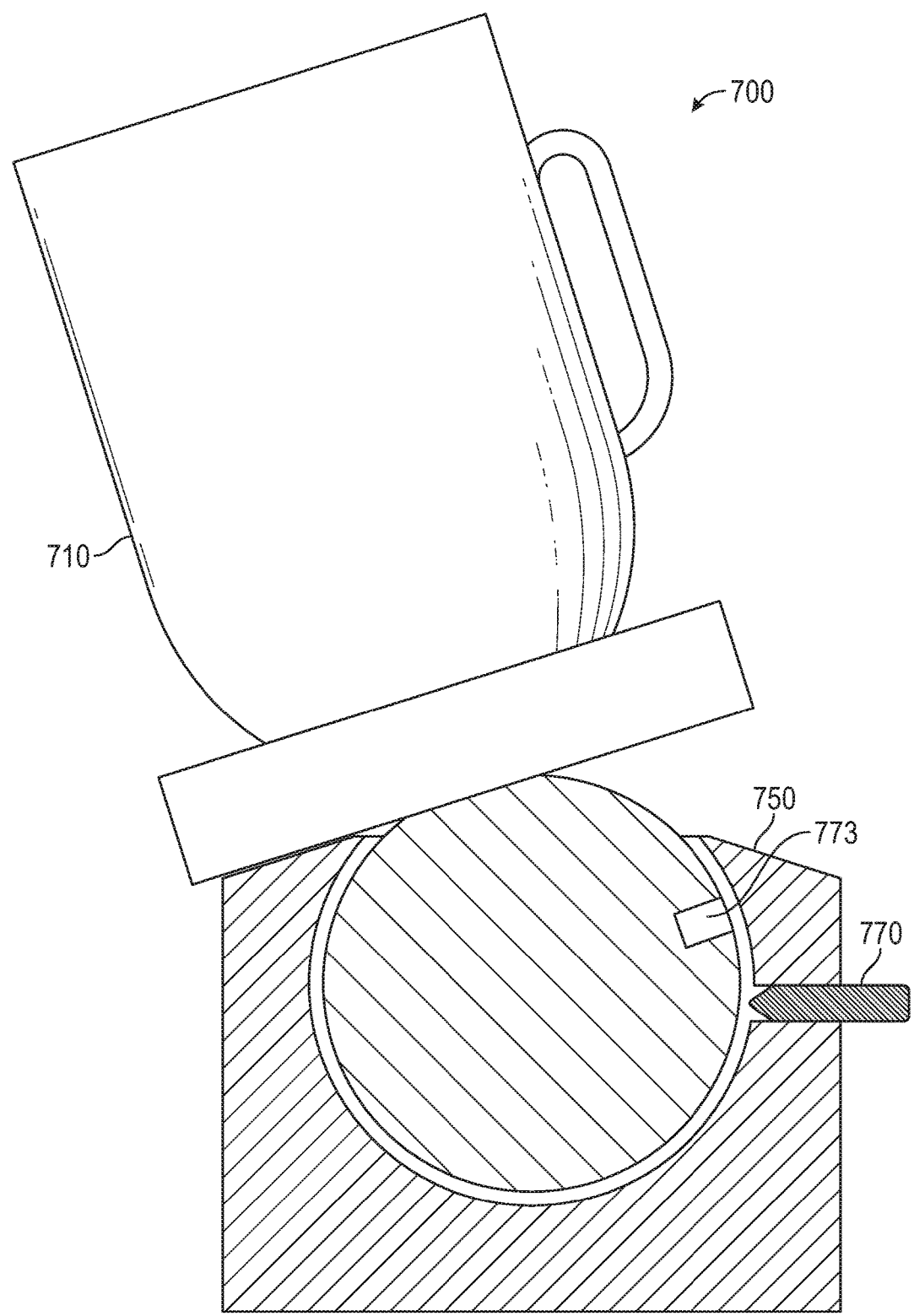
FIG. 24 is a front elevational view, partially in section, of the blender assembly shown in FIG. 23 is an unlocked and pivoted position.

Referring now to FIGS. 23 and 24, an alternative embodiment of a blender assembly 700 is shown. Assembly 700 is similar to assembly 200, but also includes a locking mechanism 770 similar to locking mechanism 570. Ball 722 includes a receiver 773 for receiving a blender motor assembly end 578, similar to blender motor assembly end 478, but with a tapered tip 778 for insertion into receiver 573.

FIG. 23 shows blender assembly 700 with blender container 710 and base 750 in a locked and vertical position, while FIG. 24 shows blender assembly 700 in an unlocked and pivoted position.

An eighth exemplary embodiment of a pivoting blender assembly 800 according to the present invention is shown in FIGS. 25-28. Blender assembly 800 includes a blender 810 mounted on a blender motor assembly 820. Blender motor assembly 820 is pivotally mounted onto a pivot base 850 such that blender 810 and motor assembly 820 can pivot in only a single plane, in a front-to-back direction.

Figure 25:
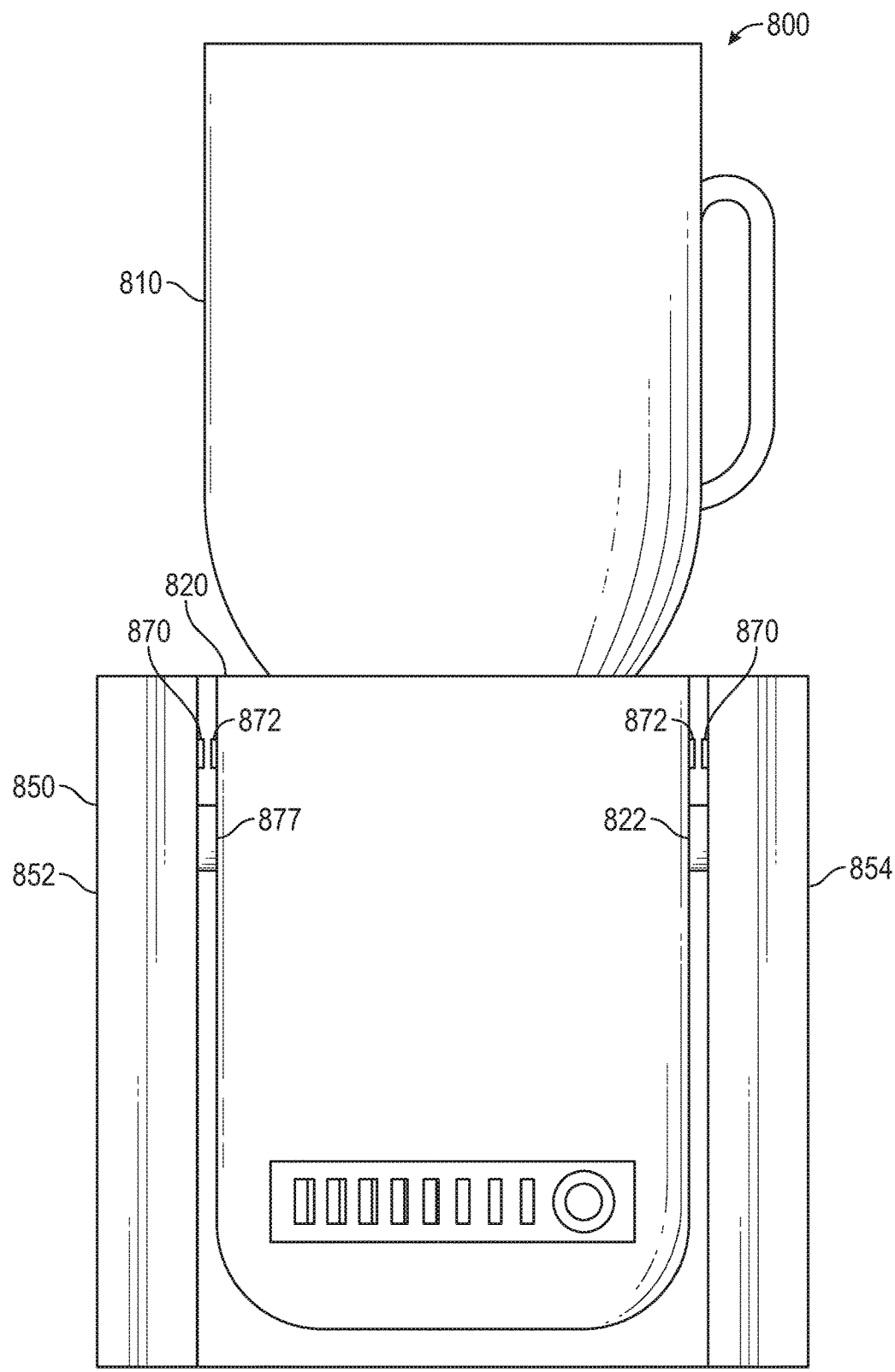
FIG. 25 is a front elevational view of a blender assembly mounted on a pivot base according to an eighth exemplary embodiment of the present invention.
Figure 26:
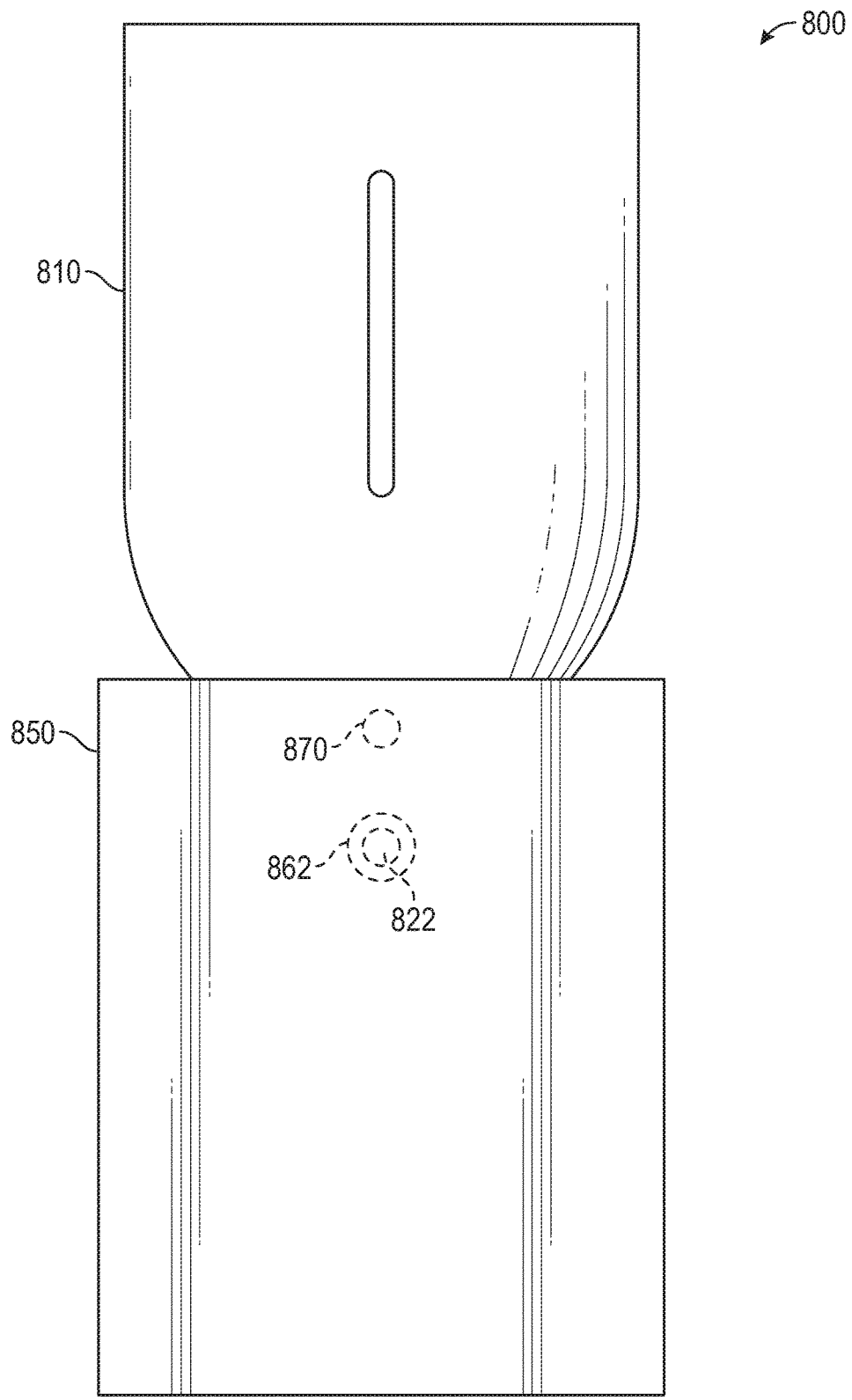
FIG. 26 is a side elevational view of the blender assembly shown in FIG. 25.
Figure 27:
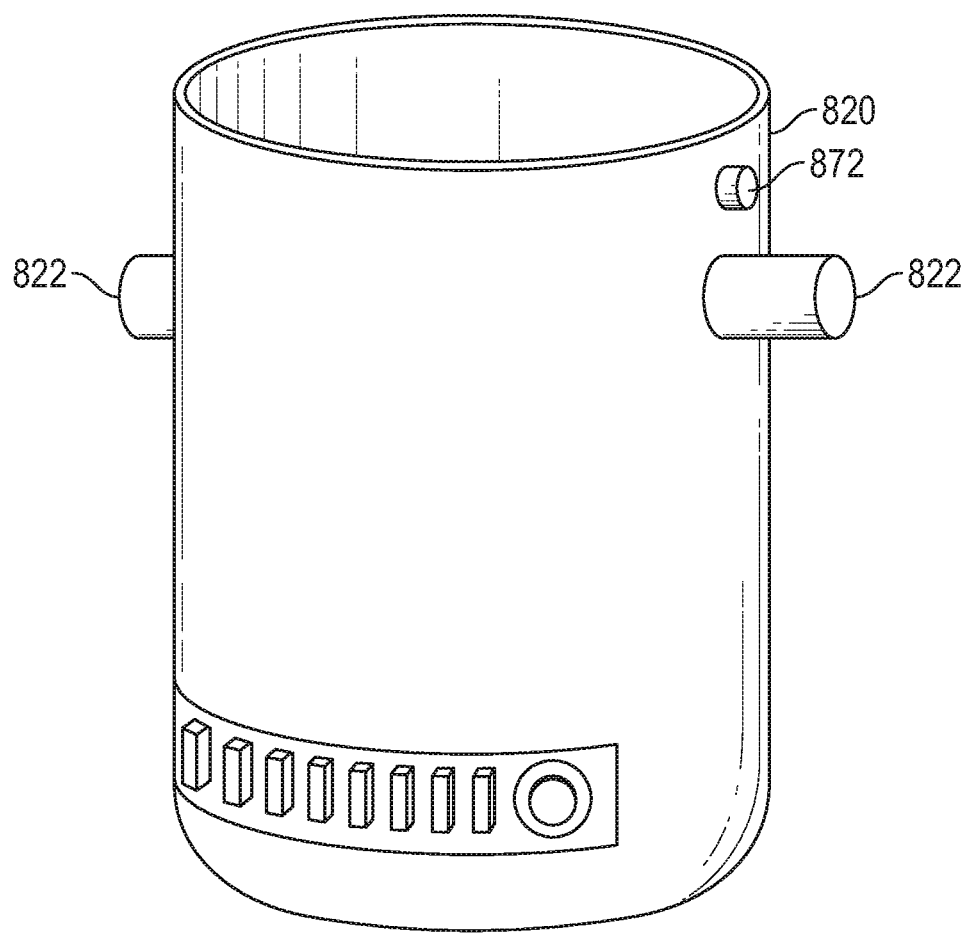
FIG. 27 is a perspective view of a blender motor for use with the blender assembly shown in FIG. 25.

Referring to FIG. 25, motor assembly 820 includes a pair of axially aligned pivot pins 822 that each extend outwardly from motor assembly 820. Each pivot pin 822 extends into pivot base 850, allowing blender motor assembly 820 to pivot relative to pivot base 850. Magnets 870 extend outwardly from side walls 852, 854 of pivot base 850. Magnetically attractive material 872 extends outwardly from motor assembly 820, such that, when blender 810 and motor assembly 820 are in an upright position, magnets 870 and magnetically attractive material 872 are co-axially aligned.

Figure 28:
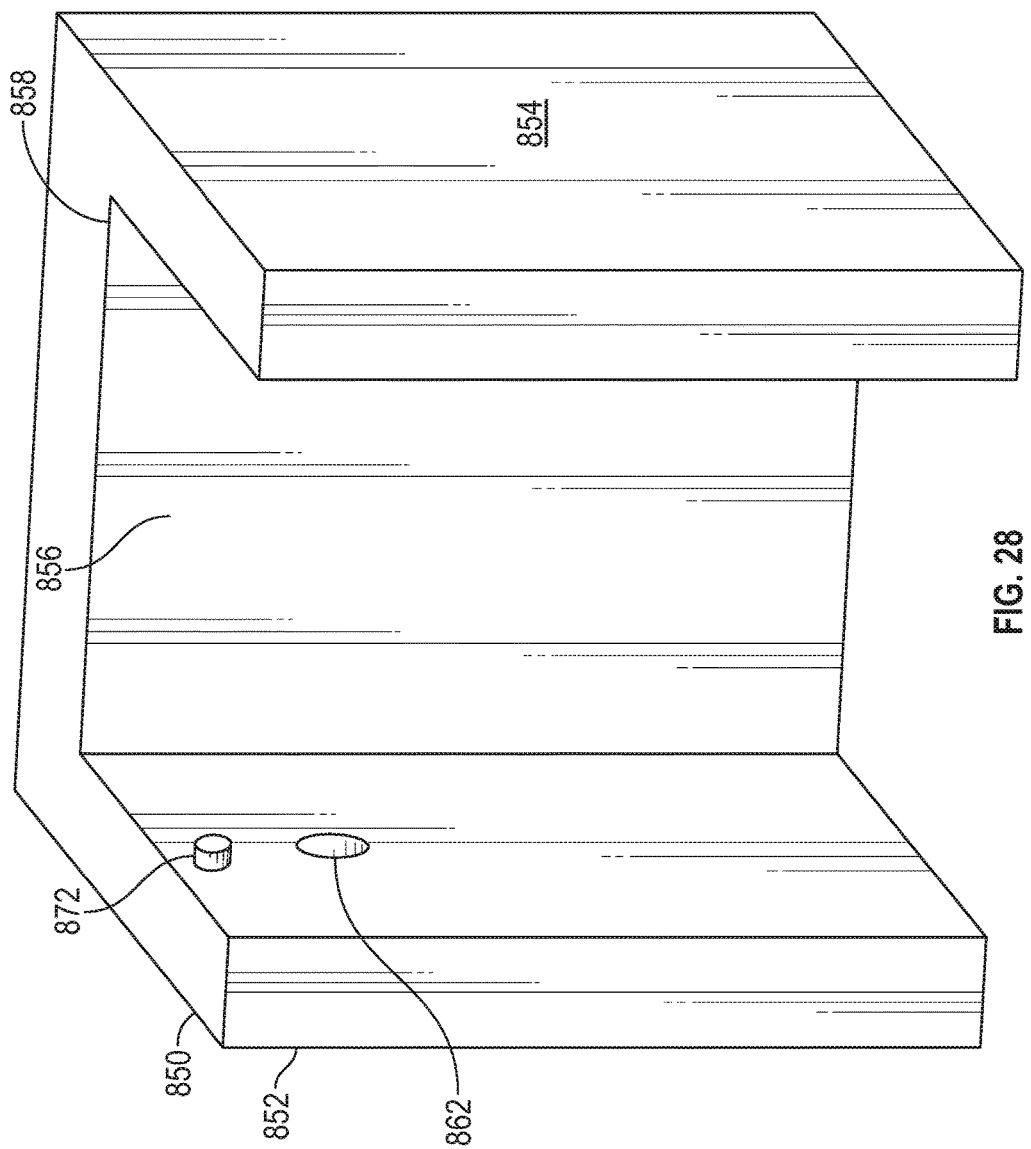
FIG. 28 is a perspective view of a pivot base for use with the blender assembly shown in FIG. 25.

Pivot base 850 is shown in FIG. 28. Pivot base 850 is generally U-shaped, with left side wall 852, right side wall 854, and a rear wall 856. Rear wall 856 includes an engagement surface 858. Engagement surface 858 is used to engage either blender 810 or motor assembly 820 during pivoting of blender 810 and motor assembly 820 and act as a stop. While engagement surface 858 is shown in FIG. 28 as an edge, those skilled in the art will recognize that engagement surface 858 can be beveled, similar to top surface 260 of pivot base 250, as described above.

Referring to FIG. 28, front of base 850 is open to allow motor assembly 820 to pivot. Each side wall 852, 854 includes a receiver 862 (one receiver 862 shown in FIG. 28) that is aligned and sized to accept a pivot pin 822 so that motor assembly 820 can pivot on pivot base 850.

The degree of pivoting of blender 810 and motor assembly 820 depends on the distance of engagement surface 858 from receivers 862, as well as the height of rear wall 856. A shorter distance between receivers 862 and/or a higher height of rear wall 856 results in less pivot ability, while a greater distance between receivers 862 and/or a lower height of rear wall 856 results in more pivot ability.

When blender 810 and motor assembly 820 are in the upright and vertical position, as shown in FIG. 25, magnets 870 attract magnetically attractive material 872 to retain blender 810 and motor assembly 820 in the upright and vertical position. To pivot blender 810, a user has to exert sufficient force to overcome the magnetic attractiveness between magnets 870 and magnetically attractive material 872. When the user releases blender 810, the weight of motor assembly 820 returns motor assembly 820 to a position wherein magnets 870 readily engage magnetically attractive material 872, stabilizing blender 810 in an upright position.

While an upright position of blender 810 is contemplated, those skilled in the art will recognize the blender 810 can also be mounted so that blender 810 is slightly tilted with respect to the vertical.

Figure 29:
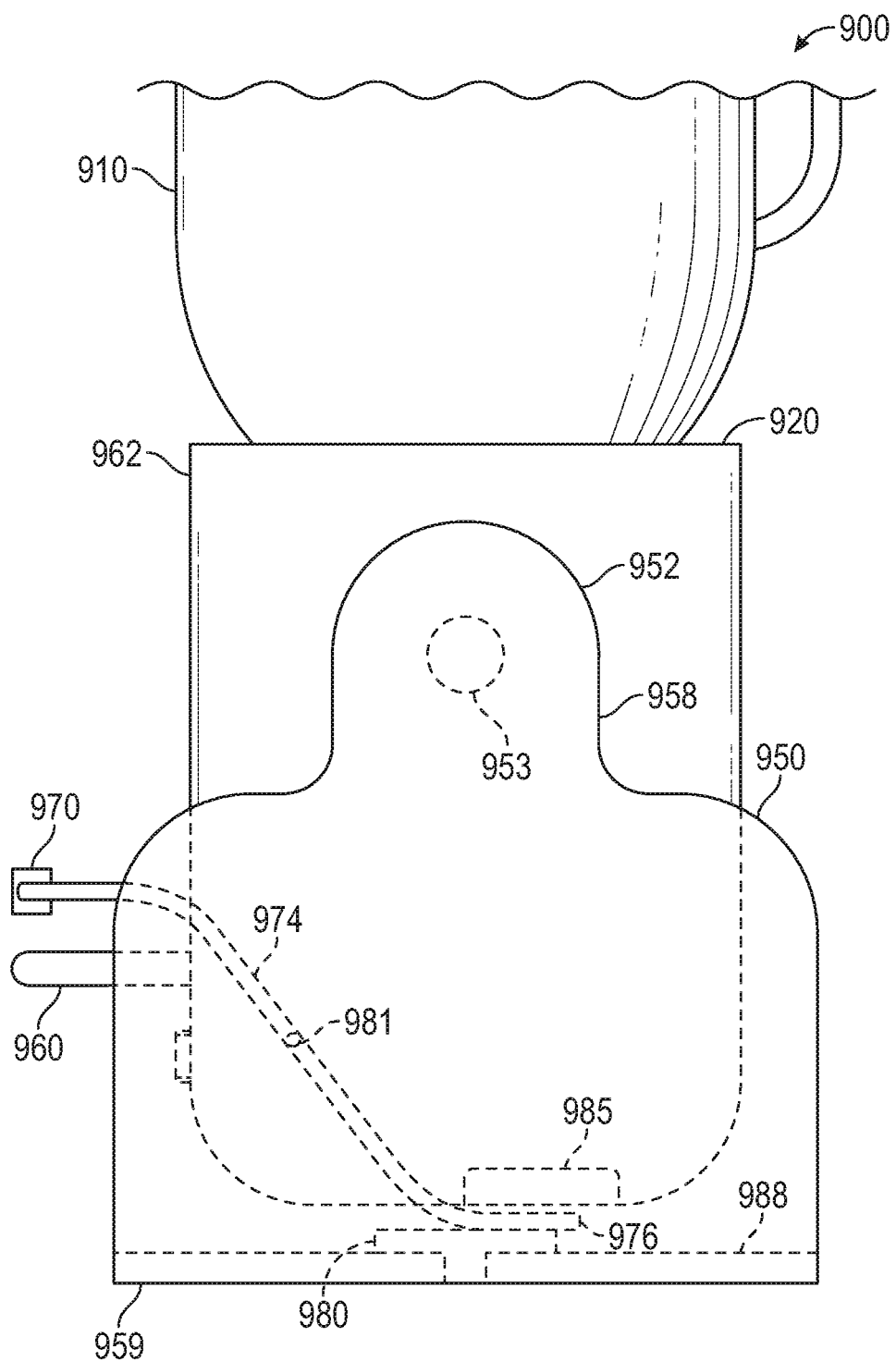
FIG. 29 is a side elevational view of a blender assembly mounted on a pivot base according to a ninth exemplary embodiment of the present invention.
Figure 30:
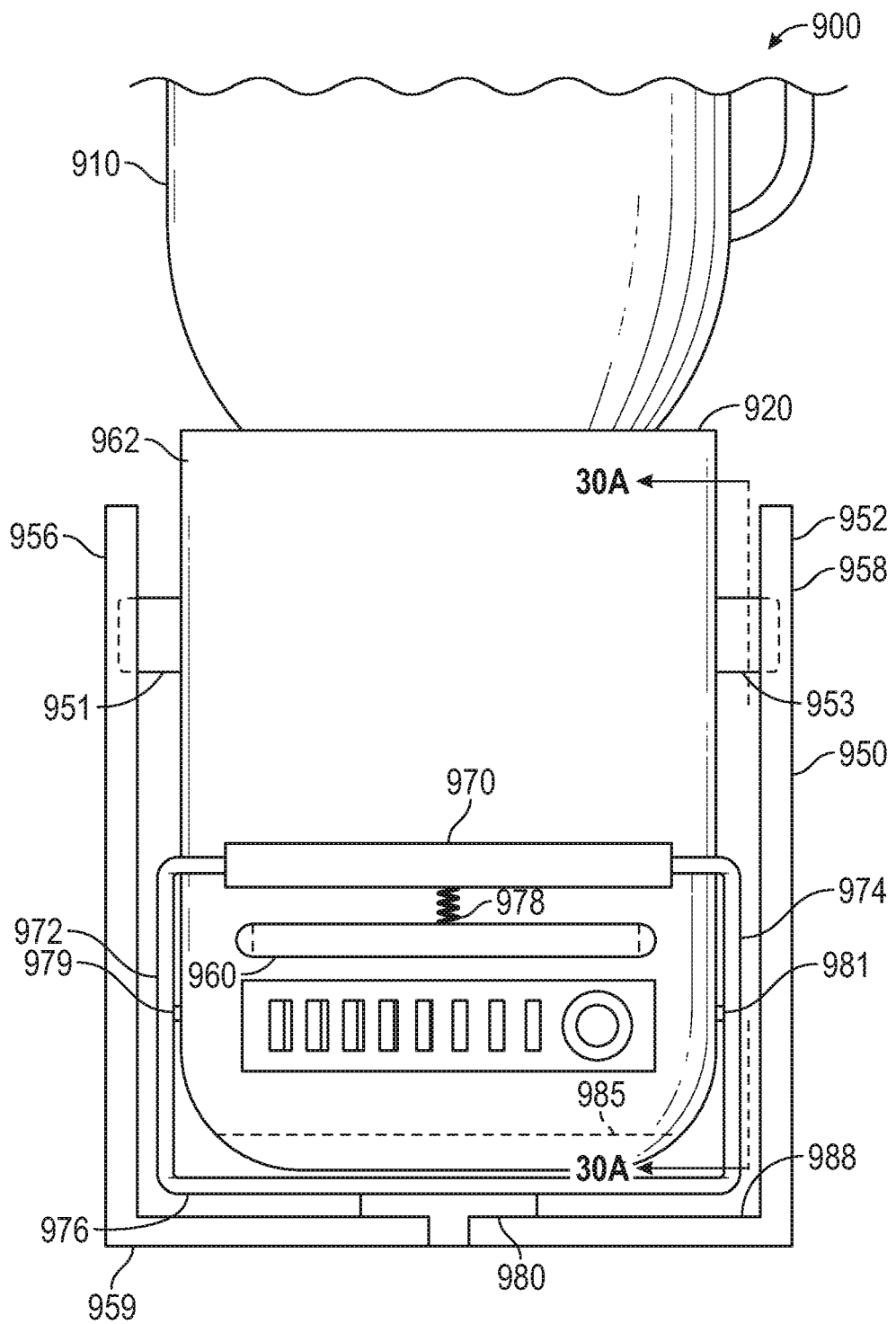
FIG. 30 is a front elevational view of the blender assembly shown in FIG. 29.
Figure 30A:
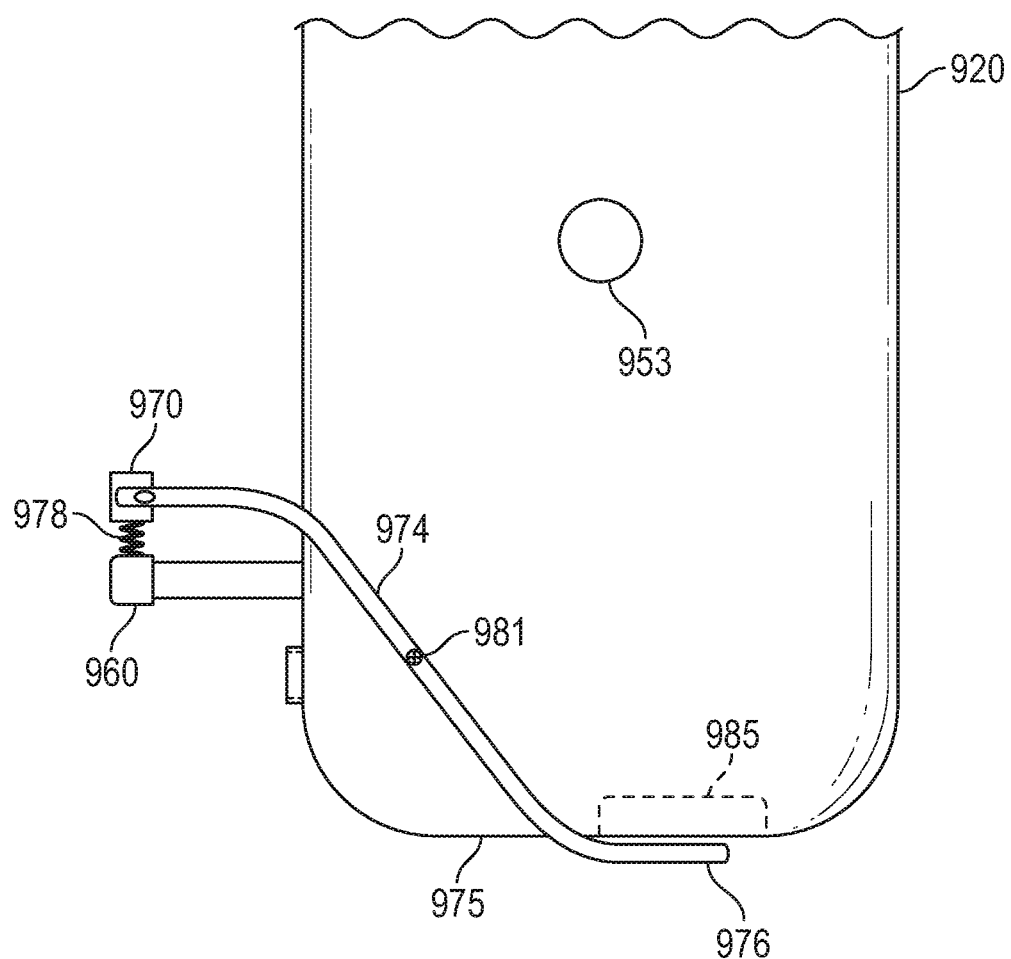
FIG. 30A is a side elevational view of the blender motor assembly of the assembly of FIG. 29, taken along lines 30A-30A of FIG. 30.
Figure 31:
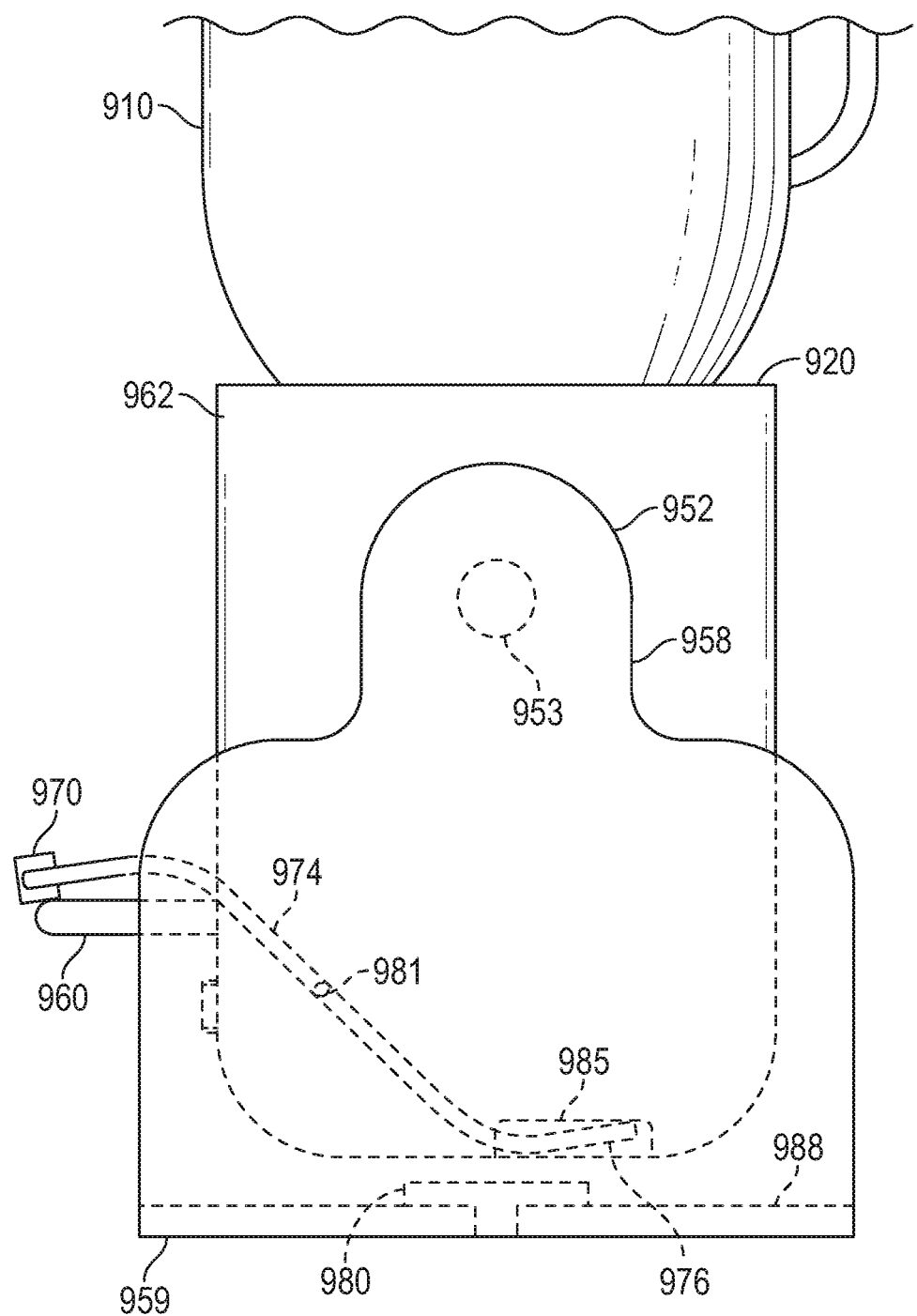
FIG. 31 is a side elevational view of the blender assembly of FIG. 31, with the blender in a forward tilted position.

A ninth exemplary embodiment of a pivoting blender assembly 900 according to the present invention is shown in FIGS. 29-31. Assembly 900 includes a blender 910 mounted on a blender motor assembly 920. Blender motor assembly 920 is pivotally mounted onto a pivot base 950 on pivot supports 951, 953 such that blender 910 and motor assembly 920 can pivot in only a single plane, in a front-to-back direction.

Pivot base 950 includes a fulcrum assembly 952 that extends upwardly from a forward face 954 of pivot base 950. Fulcrum assembly 952 includes a left fulcrum arm 956 and a right fulcrum arm 958 that extend on either side of blender motor assembly 920. Fulcrum arms 956, 958 are connected to each other along a base 959. A fixed handle 960 extends generally horizontally across the forward face 962 of blender motor assembly 920.

A pivot handle 970 extends generally horizontally across a forward face 962 of blender motor assembly 920 above fixed handle 960. Pivot handle 970 includes a right handle arm 972 pivotally connected to a right side of blender motor assembly 920 at a pivot 979 and a left handle arm 974 pivotally connected to a right side of blender motor assembly 920 at a pivot 981 so that, when pivot handle 970 is pulled downward toward fixed handle 960, pivot handle 970 pivots downwardly toward fixed handle 960.

Right handle arm 972 extends under blender motor assembly 920 and meets with left handle arm 974 under the bottom surface 975 of blender motor assembly 920 at a magnetically attractive material 976. A biasing member 978 is disposed between pivot handle 970 and fixed handle 960 to bias magnetically attractive material 976 away from bottom surface 975 of blender motor assembly 950. In an exemplary embodiment, biasing member 978 can be a helical spring, although those skilled in the art will recognize that other biasing members can be used to bias magnetically attractive material 976 away from bottom surface 975 of blender motor assembly 950.

A longitudinal recess 985 is formed in bottom surface 975 of blender motor assembly 950 to allow right handle arm 972 and left handle arm 974 that extend under bottom surface 975 of blender motor assembly 920 to nest in recess 985 when pivot handle 970 is depressed toward fixed handle 960.

A magnet 980 is centered along a top surface 988 of base 959 to magnetically engage magnetically attractive material 976 and magnetically releasably secure blender motor assembly 920 to pivot base 950. When pivot handle 970 is not depressed toward fixed handle 960, magnet 980 engages magnetically attractive material 976 and retains blender motor assembly 920 on top of pivot base 950. A user has to break the force of magnetic attraction between magnet 980 and magnetically attractive material 976 in order to be able to pivot blender motor assembly 920 with respect to pivot base 950. In an exemplary embodiment, both magnet 980 and magnetically attractive material 976 are located distal from handles 970, 960 to increase the amount of torque required to overcome that magnetic attraction.

To break the force of magnetic attraction and to allow blender 910 to pivot relative to pivot base 950, as shown in FIG. 31, a user grasps both fixed handle 960 and pivot handle 970 and biases pivot handle 970 toward fixed handle 960, handle arms 972, 974 pivot relative to blender motor assembly 920 and into recess 985, allowing magnetically attractive material 976 to break away from magnet 980. The user is then free to rock blender motor assembly 920 with blender 910 back and forth to free food particles that may be stuck to the side wall of blender 910.

The weight distribution of the blender motor assembly 920 and blender 910, along with the biasing effect of biasing member 978, is such that, when the user releases pivot handle 970, arms 972, 974 with magnetically attractive material 976 drop out of recess 985 and the blender motor assembly 920 pivots so that magnet 980 engages magnetically attractive material 976 to releasably secure blender motor assembly 920 to pivot base 950.

While blender assemblies 100-900 are contemplated for use on a countertop for personal or small batch use, those skilled in the art will recognize that blender assemblies 100-900 can be scaled up in size and mounted on a floor for industrial applications.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A blender assembly comprising:
   a base;
   a blender pivotally mounted on the base such that the blender pivots in only a single plane; and
   a magnetic locking assembly releasably securing the blender to the base to allow the blender to pivot with respect to the base,
   wherein the magnetic locking assembly comprises a magnet mounted on the base and a magnetically attractive material mounted on the blender such that, when the blender is in an upright and vertical position, the magnet is aligned with the magnetically attractive material, and
   wherein the base comprises a base handle and the blender comprises a blender handle such that, when the blender handle is urged toward the base handle, the magnetically attractive material is pivoted away from the magnet.

2. The blender assembly according to claim 1, wherein when the blender handle is released, the magnetically attractive material engages the magnet.

3. The blender assembly according to claim 1, wherein the base comprises a pivot arm and wherein the blender is mounted on the pivot arm.

4. The blender assembly according to claim 1, wherein a front portion of the blender handle is located vertically above a front portion of the base handle.

5. The blender assembly according to claim 1, wherein the blender handle is spring biased relative to the base handle.

6. A blender assembly comprising:
   a base having:
      a bottom;
      two opposing sides extending upwardly from the bottom;
      a magnet attached to the bottom; and
   a blender pivotally mounted on the two opposing sides such that the blender pivots in only a single plane, the blender comprising:
      a fixed handle extending outwardly therefrom;
      a pivot handle mounted to pivot about toward the fixed handle, the pivot handle having a magnetically attractive portion such that, when the pivot handle is away from the fixed handle, the magnetically attractive portion engages the magnet and when the pivot handle is depressed toward the fixed handle, the magnetically attractive portion is biased away from the magnet.

7. The blender assembly according to claim 6, wherein the blender has a motor assembly extending downwardly therefrom and wherein the motor assembly has a recess formed therein such that, when the pivot handle is depressed toward the fixed handle, a portion of the pivot handle nests in the recess.

8. The blender assembly according to claim 6, wherein the blender is pivotally mounted along an axis and wherein the pivot handle is mounted below the axis.

9. The blender assembly according to claim 6, wherein the pivot handle is biased away from the fixed handle.

10. A blender assembly comprising:
    a base configured to pivotally support a blender;
    a magnet attached to the base;
    a blender pivotally mounted on the base; and
    a pivot handle pivotally attached to the blender and having a magnetically attractive portion extending under the blender, the magnetically attractive portion being releasably engageable with the magnet.

11. The blender assembly according to claim 10, further comprising a fixed handle fixedly mounted to the blender.

12. The blender assembly according to claim 11, wherein the pivot handle comprises a front portion configured to the biased toward the fixed handle to release the magnetically attractive portion from the magnet.

13. The blender assembly according to claim 12, wherein the blender has a motor assembly extending downwardly therefrom and wherein the motor assembly has a recess formed therein such that, when the pivot handle is depressed toward the fixed handle, a portion of the pivot handle nests in the recess.

* * * * *